(12) United States Patent
Chung et al.

(10) Patent No.: US 9,235,031 B2
(45) Date of Patent: Jan. 12, 2016

(54) WIDE-ANGLE IMAGE TAKING LENS SYSTEM

(71) Applicant: GLORY SCIENCE CO., LTD., Changhua Hsien (TW)

(72) Inventors: Feng-Chao Chung, Changhua Hsien (TW); Kun-Ti Liu, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 13 days.

(21) Appl. No.: 14/461,078

(22) Filed: Aug. 15, 2014

(65) Prior Publication Data

US 2015/0098137 A1 Apr. 9, 2015

Related U.S. Application Data

(63) Continuation of application No. 61/886,335, filed on Oct. 3, 2013.

(51) Int. Cl.
| | |
|---|---|
| *G02B 3/02* | (2006.01) |
| *G02B 13/18* | (2006.01) |
| *G02B 9/60* | (2006.01) |
| *G02B 13/00* | (2006.01) |
| G02B 5/00 | (2006.01) |
| G02B 27/01 | (2006.01) |
| G02B 3/04 | (2006.01) |

(52) U.S. Cl.
CPC .............. *G02B 13/0045* (2013.01); *G02B 9/60* (2013.01); *G02B 3/04* (2013.01); *G02B 5/005* (2013.01); *G02B 13/002* (2013.01); *G02B 13/18* (2013.01); *G02B 27/0101* (2013.01)

(58) Field of Classification Search
CPC ...... G02B 13/0045; G02B 9/60; G02B 13/18; G02B 3/04; G02B 27/0101; G02B 13/002; G02B 5/005
USPC .................................. 359/619, 714, 739, 770
See application file for complete search history.

(56) References Cited

U.S. PATENT DOCUMENTS

| | | | | |
|---|---|---|---|---|
| 5,153,779 | A * | 10/1992 | Ohashi | G02B 13/24 359/763 |
| 7,995,291 | B2 * | 8/2011 | Yamamoto | G02B 7/008 359/713 |
| 8,335,043 | B2 | 12/2012 | Huang | |
| 8,395,853 | B2 | 3/2013 | Chen et al. | |
| 8,576,497 | B2 | 11/2013 | Hsu et al. | |
| 8,593,737 | B2 | 11/2013 | Tang et al. | |
| 8,717,689 | B2 * | 5/2014 | Chen | G02B 9/60 359/714 |
| 2003/0048543 | A1 * | 3/2003 | Ohno | G02B 9/08 359/691 |

(Continued)

*Primary Examiner* — Evelyn A Lester
(74) *Attorney, Agent, or Firm* — Gemini Patent Services, Inc.; Stephen Hsu; Li K. Wang

(57) ABSTRACT

A wide-angle image taking lens system includes an aperture stop and an optical assembly including: in order from an object side to an image side: first, second, third, fourth and fifth lens elements, the system has a total of five lens elements with refractive power, wherein Abbe numbers of the first and fifth lens element are V1, V5, a distance along an optical axis between the first and second lens element is T12, a central thickness of the first lens element is CT1, focal lengths of the system, second and third lens elements are f, f2, f3, maximum effective diameters of an object-side surface of the first lens element and an image-side surface of the fifth lens element are CA11, CA52, satisfying: $1.5<V1/V5<3$; $1.1<T12/CT1<2.5$; $0.2<|f/f3|+|f/f2|<1.5$; $0.2<CA11/CA52<0.5$.

18 Claims, 24 Drawing Sheets

(56) References Cited

U.S. PATENT DOCUMENTS

| | | | |
|---|---|---|---|
| 2007/0236811 A1* | 10/2007 | Mori | G02B 9/34 359/770 |
| 2013/0107375 A1* | 5/2013 | Huang | G02B 13/0045 359/714 |
| 2013/0279023 A1* | 10/2013 | Chen | G02B 13/0045 359/714 |
| 2014/0029116 A1* | 1/2014 | Tsai | G02B 13/0045 359/714 |
| 2014/0085735 A1* | 3/2014 | Shih | G02B 13/0045 359/714 |

\* cited by examiner

WIDE-ANGLE IMAGE TAKING LENS SYSTEM

CROSS REFERENCE TO RELATED APPLICATION

This application is a non-provisional of US 61/886,335, filed on Oct. 3, 2013, the specification of which is hereby incorporated in its entirety by reference.

BACKGROUND OF THE INVENTION

1. Field of the Invention

The present invention relates to a wide-angle image taking lens system, and more particularly to a miniaturized wide-angle image taking lens system applicable to electronic products.

2. Description of the Prior Art

With the development of high-standard mobile devices, such as, smartphone, tablet computer and so on, small image taking lens system with high image quality has become the standard equipment. In addition, with the popular of social networks, more and more people like to take photographs or take selves and share with others, and recreational machine, driving recorder, security camera lens and so on need wider angle of view, therefore, there's an increasing demand for angle of view and image quality. The image taking lens system disclosed in U.S. Pat. Nos. 8,335,043 and 8,576,497 are all provided with five to six lens elements in order to provide wider angle of view, which, however, causes large distortion. The image taking lens system disclosed in U.S. Pat. Nos. 8,593,737, 8,576,497 and 8,395,853 are all provided with a maximal field of view (FOV) that is smaller than 85 degrees, and the total track length of these image taking lens system is also too long.

The present invention been made in order to solve the above-mentioned problems.

SUMMARY OF THE INVENTION

The primary objective of the present invention is to provide a wide-angle image taking lens system having a wide field of view, high resolution, extra short track length and small distortion.

According to one aspect of the present invention, a wide-angle image taking lens system comprises an aperture stop and an optical assembly, the optical assembly comprises, in order from the object side to the image side: a first lens element with a negative refractive power having an aspheric object-side surface and an aspheric image-side surface; a second lens element with a positive refractive power having an aspheric object-side surface being convex near the optical axis and an aspheric image-side surface, the second lens element being made of plastic material; a third lens element with a refractive power having an aspheric object-side surface and an aspheric image-side surface, the third lens element being made of plastic material; a fourth lens element with a positive refractive power having an aspheric object-side surface and an aspheric image-side surface being convex near the optical axis, the fourth lens element being made of plastic material; a fifth lens element with a negative refractive power having an aspheric object-side surface and an aspheric image-side surface being concave near the optical axis, the fifth lens element being made of plastic material, and more than one inflection point being formed on the image-side surface of the fifth lens element.

Wherein the Abbe number of the first lens element is V1, the Abbe number of the fifth lens element is V5, the distance along an optical axis between the first lens element and the second lens element is T12, the central thickness of the first lens element is CT1, the focal length of the wide-angle image taking lens system is f, the focal length of the second lens element is f2, the focal length of the third lens element is f3, the maximum effective diameter of the object-side surface of the first lens element is CA11, the maximum effective diameter of the image-side surface of the fifth lens element is CA52, and the following conditions are satisfied:

$$1.5 < V1/V5 < 3;$$

$$1.1 < T12/CT1 < 2.5;$$

$$0.2 < |f/f3| + |f/f2| < 1.5;$$

$$0.2 < CA11/CA52 < 0.5.$$

If V1/V5 satisfies the above condition, the chromatic aberration of the wide-angle image taking lens system can be reduced.

If T12/CT1 satisfies the above condition, the maximal field of view of the wide-angle image taking lens system can be increased effectively.

If |f/f3|+|f/f2| satisfies the above condition, the refractive power of the second lens element and the third lens element can be distributed better, so that the sensitivity to assembly can be reduced.

If CA11/CA52 satisfies the above condition, the total track length of the wide-angle image taking lens system can be reduced effectively, and the chief ray angle with respect to the image plane of the wide-angle image taking lens system can cooperate with the electronic sensor that is disposed on the image plane to avoid causing color shift.

Preferably, the central thickness of the first lens element is CT1, the central thickness of the second lens element is CT2, the central thickness of the third lens element is CT3, the central thickness of the fourth lens element is CT4, and the following condition is satisfied: $2.7 < (CT2+CT4)/(CT1+CT3) < 4.5$, it can further maintain the objective of miniaturization of the wide-angle image taking lens system.

Preferably, the focal length of the wide-angle image taking lens system is f, the focal length of the second lens element is f2, and the following condition is satisfied: $0.9 < f2/f < 5.5$, which can correct the aberrations caused by the first lens element.

Preferably, the focal length of the wide-angle image taking lens system is f, the radius of curvature of the object-side surface of the second lens element is R3, and the following condition is satisfied: $1.1 < R3/f < 4$, which can correct the astigmatism.

Preferably, the central thickness of the fourth lens element is CT4, the central thickness of the fifth lens element is CT5, and the following condition is satisfied: $1.85 < CT4/CT5 < 4.3$, which can further reduce the track length of the wide-angle image taking lens system and make the fourth and fifth lens elements easy to manufacture, so as to reduce the cost.

Preferably, the focal length of the first lens element is f1, the focal length of the fifth lens element is f5, and the following condition is satisfied: $0 < f5/f1 < 0.5$, so that the refractive power of the first lens element and the fifth lens element can be distributed better, it can increase the field of view and maintain suitable sensitivity to assembly. In addition, it can maintain a suitable back focal length of the wide-angle image taking lens system, it will be favorable to assemble the electronic sensor and place the IR cut filter.

Preferably, the focal length of the wide-angle image taking lens system is f, the distance along an optical axis between the first lens element and the second lens element is T12, and the following condition is satisfied: 1.0<T12*10/f<3.0, so that the maximal field of view of the wide-angle image taking lens system can be increased effectively.

Preferably, the maximal field of view of the wide-angle image taking lens system is FOV, and the following condition is satisfied: 86<FOV<115, the larger field of view can be provided for wide-range imaging.

According to another aspect of the present invention, a wide-angle image taking lens system comprises an aperture stop and an optical assembly, the optical assembly comprises, in order from the object side to the image side: a first lens element with a negative refractive power having an aspheric object-side surface and an aspheric image-side surface; a second lens element with a positive refractive power having an aspheric object-side surface being convex near the optical axis and an aspheric image-side surface, the second lens element being made of plastic material; a third lens element with a refractive power having an aspheric object-side surface and an aspheric image-side surface, the third lens element being made of plastic material; a fourth lens element with a positive refractive power having an aspheric object-side surface being concave near the optical axis and an aspheric image-side surface being convex near the optical axis, the fourth lens element being made of plastic material; a fifth lens element with a negative refractive power having an aspheric object-side surface being convex near the optical axis and an aspheric image-side surface being concave near the optical axis, the fifth lens element being made of plastic material, more than one inflection point being formed on the image-side surface of the fifth lens element, and the aperture stop located between the image-side surface of the first lens element and the image-side surface of the second lens element.

Wherein the Abbe number of the first lens element is V1, the Abbe number of the fifth lens element is V5, the distance along an optical axis between the first lens element and the second lens element is T12, the focal length of the wide-angle image taking lens system is f, and the following conditions are satisfied:

$$1.5 < V1/V5 < 3;$$

$$0.8 < T12*10/f < 3.0.$$

If V1/V5 satisfies the above condition, the chromatic aberration of the wide-angle image taking lens system can be reduced.

If T12*10/f satisfies the above condition, the maximal field of view of the wide-angle image taking lens system can be increased effectively.

Preferably, the distance along an optical axis between the first lens element and the second lens element is T12, the central thickness of the first lens element is CT1, and the following condition is satisfied: 1.1<T12/CT1<2.5, which can further increase the maximal field of view of the wide-angle image taking lens system.

Preferably, the focal length of the first lens element is f1, the focal length of the fifth lens element is f5, and the following condition is satisfied: 0<f5/f1<0.5, so that the refractive power of the first lens element and the fifth lens element can be distributed better, it can increase the field of view and maintain suitable sensitivity to assembly. In addition, it can maintain a suitable back focal length of the wide-angle image taking lens system, it will be favorable to assemble the electronic sensor and place the IR cut filter.

Preferably, the focal length of the wide-angle image taking lens system is f, the focal length of the second lens element is f2, the focal length of the third lens element is f3, and the following condition is satisfied: 0.2<|f/f3|+|f/f2|<1.5, so that the refractive power of the second lens element and the third lens element can be distributed better, it can reduce the sensitivity to assembly.

Preferably, the focal length of the wide-angle image taking lens system is f, the radius of curvature of the object-side surface of the second lens element is R3, and the following condition is satisfied: 1.1<R3/f<4, which can correct the astigmatism.

Preferably, the central thickness of the first lens element is CT1, the central thickness of the second lens element is CT2, the central thickness of the third lens element is CT3, the central thickness of the fourth lens element is CT4, and the following condition is satisfied: 2.7<(CT2+CT4)/(CT1+CT3)<4.5, it can further maintain the objective of miniaturization of the wide-angle image taking lens system.

Preferably, the focal length of the wide-angle image taking lens system is f, the focal length of the third lens element is f3, and the following condition is satisfied: 0<|f/f3|<0.45, which can reduce the distortion effectively.

Preferably, the image-side surface of the second lens element is convex near the optical axis, and the object-side surface of the third lens element is convex near the optical axis, which can further correct the field curvature of the wide-angle image taking lens system.

Preferably, the focal length of the wide-angle image taking lens system is f, the focal length of the second lens element is f2, and the following condition is satisfied: 0.9<f2/f<5.5, which can correct the aberrations caused by the first lens element.

Preferably, the maximal field of view of the wide-angle image taking lens system is FOV, and the following condition is satisfied: 86<FOV<115, the larger field of view can be provided for wide-range imaging.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
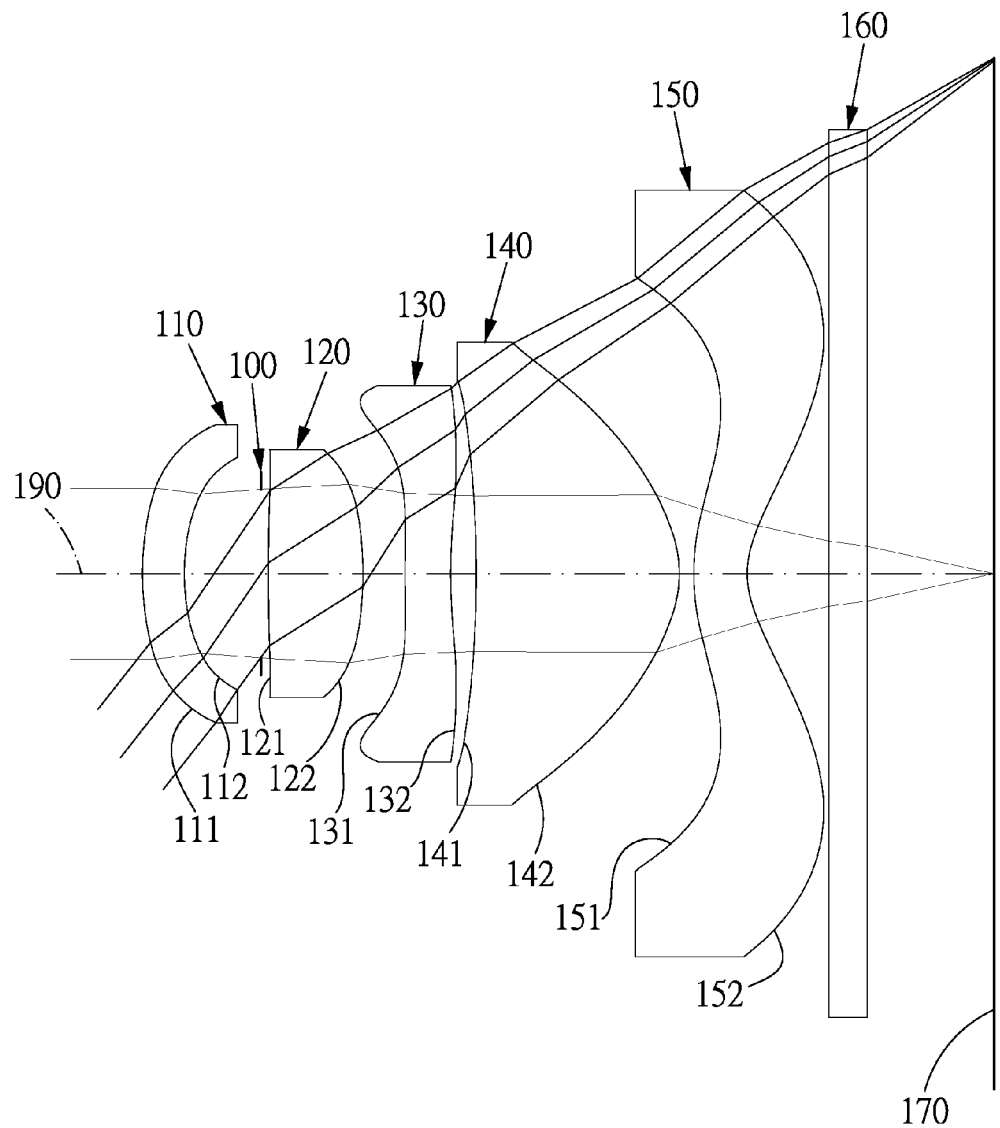
FIG. 1A shows a wide-angle image taking lens system in accordance with a first embodiment of the present invention.
Figure 1B:
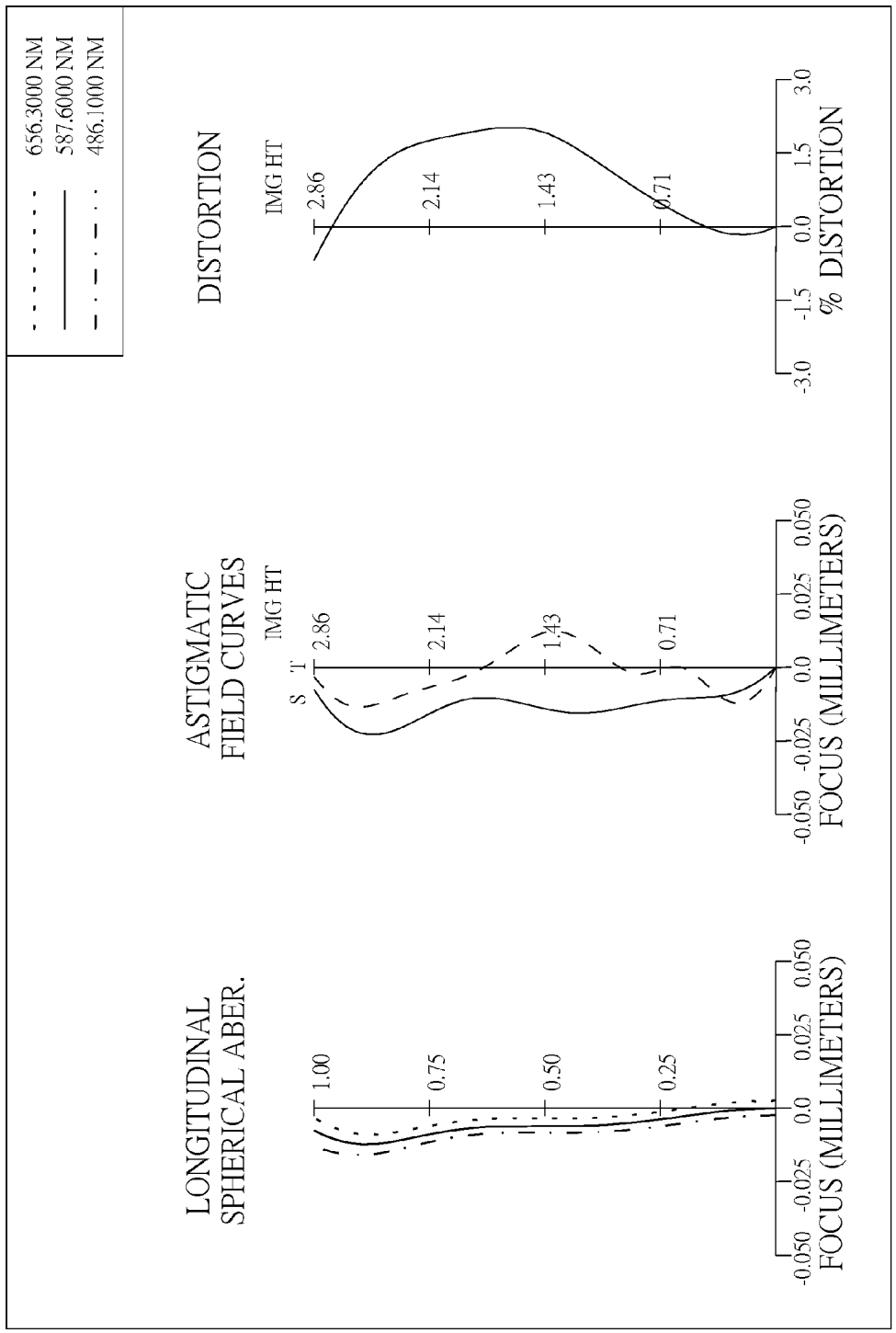
FIG. 1B shows the longitudinal spherical aberration curve, the astigmatic field curve and the distortion curve of the first embodiment of the present invention.

FIG. 1A shows a wide-angle image taking lens system in accordance with a first embodiment of the present invention, and FIG. 1B shows, in order from left to right, the longitudinal spherical aberration curves, the astigmatic field curves, and the distortion curve of the first embodiment of the present invention. A wide-angle image taking lens system in accordance with the first embodiment of the present invention comprises an aperture stop 100 and an optical assembly. The optical assembly comprises, in order from an object side to an image side: a first lens element 110, a second lens element 120, a third lens element 130, a fourth lens element 140, a fifth lens element 150, an IR cut filter 160 and an image plane 170, wherein the wide-angle image taking lens system has a total of five lens elements with refractive power. The aperture stop 100 is located between an image-side surface 112 of the first lens element 110 and an image-side surface 122 of the second lens element 120.

The first lens element 110 with a negative refractive power has an object-side surface 111 being convex near an optical axis 190 and the image-side surface 112 being concave near the optical axis 190, both the object-side and image-side surfaces 111, 112 are aspheric, and the first lens element 110 is made of plastic material.

The second lens element 120 with a positive refractive power has an object-side surface 121 being convex near the optical axis 190 and the image-side surface 122 being convex near the optical axis 190, both the object-side and image-side surfaces 121, 122 are aspheric, and the second lens element 120 is made of plastic material.

The third lens element 130 with a negative refractive power has an object-side surface 131 being convex near the optical axis 190 and an image-side surface 132 being concave near the optical axis 190, both the object-side and image-side surfaces 131, 132 are aspheric, and the third lens element 130 is made of plastic material.

The fourth lens element 140 with a positive refractive power has an object-side surface 141 being concave near the optical axis 190 and an image-side surface 142 being convex near the optical axis 190, both the object-side and image-side surfaces 141, 142 are aspheric, and the fourth lens element 140 is made of plastic material.

The fifth lens element 150 with a negative refractive power has an object-side surface 151 being convex near the optical axis 190 and an image-side surface 152 being concave near the optical axis 190, both the object-side and image-side surfaces 151, 152 are aspheric, the fifth lens element 150 is made of plastic material, and more than one inflection point is formed on the object-side surface 151 and the image-side surface 152 of the fifth lens element 150.

The IR cut filter 160 made of glass is located between the fifth lens element 150 and the image plane 170 and has no influence on the focal length of the wide-angle image taking lens system.

The equation for the aspheric surface profiles of the first embodiment is expressed as follows:

$$z(h) = \frac{ch^2}{1+\sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

$A_4, A_6, A_8, A_{10}, A_{12}, A_{14} \ldots$ : represent the high-order aspheric coefficients.

In the first embodiment of the present wide-angle image taking lens system, the focal length of the wide-angle image taking lens system is f, the f-number of the wide-angle image taking lens system is Fno, half of the maximal field of view of the wide-angle image taking lens system is HFOV, and the following conditions are satisfied:

f=2.255 mm; Fno=2.4, and HFOV=51.7 degrees.

In the first embodiment of the present wide-angle image taking lens system, the maximal field of view of the wide-angle image taking lens system is FOV, and the following condition is satisfied:

$FOV=103.4$.

In the first embodiment of the present wide-angle image taking lens system, the Abbe number of the first lens element 110 is V1, the Abbe number of the fifth lens element 150 is V5, and the following condition is satisfied:

$V1/V5=2.48$.

In the first embodiment of the present wide-angle image taking lens system, the distance along the optical axis 190 between the first lens element 110 and the second lens element 120 is T12, the central thickness of the first lens element 110 is CT1, and the following condition is satisfied:

$T12/CT1=2.02$.

In the first embodiment of the present wide-angle image taking lens system, the focal length of the wide-angle image taking lens system is f, the focal length of the second lens element 120 is f2, the focal length of the third lens element 130 is f3, and the following condition is satisfied:

$|f/f3|+|f/f2|=1.02$.

In the first embodiment of the present wide-angle image taking lens system, the maximum effective diameter of the object-side surface 111 of the first lens element 110 is CA11, the maximum effective diameter of the image-side surface 152 of the fifth lens element 150 is CA52, and the following condition is satisfied:

$CA11/CA52=0.38$.

In the first embodiment of the present wide-angle image taking lens system, the central thickness of the first lens element 110 is CT1, the central thickness of the second lens element 120 is CT2, the central thickness of the third lens element 130 is CT3, the central thickness of the fourth lens element 140 is CT4, and the following condition is satisfied:

$(CT2+CT4)/(CT1+CT3)=3.42$.

In the first embodiment of the present wide-angle image taking lens system, the focal length of the wide-angle image taking lens system is f, the focal length of the second lens element 120 is f2, and the following condition is satisfied:

$f2/f=1.46$.

In the first embodiment of the present wide-angle image taking lens system, the focal length of the wide-angle image taking lens system is f, the radius of curvature of the object-side surface 121 of the second lens element 120 is R3, and the following condition is satisfied:

$R3/f=2.79$.

In the first embodiment of the present wide-angle image taking lens system, the central thickness of the fourth lens element 140 is CT4, the central thickness of the fifth lens element 150 is CT5, and the following condition is satisfied:

$CT4/CT5=3.80$.

In the first embodiment of the present wide-angle image taking lens system, the focal length of the wide-angle image taking lens system is f, the focal length of the fifth lens element 150 is f5, and the following condition is satisfied:

$f5/f1=0.12$.

In the first embodiment of the present wide-angle image taking lens system, the focal length of the wide-angle image taking lens system is f, the distance along the optical axis 190 between the first lens element 110 and the second lens element 120 is T12, and the following condition is satisfied:

$T12*10/f=2.05$.

In the first embodiment of the present wide-angle image taking lens system, the focal length of the wide-angle image taking lens system is f, the focal length of the third lens element 130 is f3, and the following condition is satisfied:

$|f/f3|=0.33$.

The detailed optical data of the first embodiment is shown in Table 1, and the aspheric surface data is shown in Table 2.

TABLE 1

(Embodiment 1)
f(focal length) = 2.255 mm, Fno = 2.4, HFOV = 51.7 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 2.0000(ASP) | 0.23 | Plastic | 1.515 | 57.0 | −13.53 |
| 2 | | 1.4930(ASP) | 0.42 | | | | |
| 3 | Aperture stop | Plane | 0.04 | | | | |
| 4 | Lens 2 | 6.3030(ASP) | 0.52 | Plastic | 1.533 | 55.7 | 3.29 |
| 5 | | −2.3594(ASP) | 0.23 | | | | |
| 6 | Lens 3 | 8.0590(ASP) | 0.25 | Plastic | 1.632 | 23.0 | −6.79 |
| 7 | | 2.7667(ASP) | 0.14 | | | | |
| 8 | Lens 4 | −6.4992(ASP) | 1.12 | Plastic | 1.544 | 56.5 | 1.24 |
| 9 | | −0.6467(ASP) | 0.08 | | | | |
| 10 | Lens 5 | 1.1299(ASP) | 0.30 | Plastic | 1.632 | 23.0 | −1.65 |
| 11 | | 0.4873(ASP) | 0.45 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 2

Aspheric Coefficients

| Surface # | 1 | 2 | 4 | 5 | 6 |
|---|---|---|---|---|---|
| k= | 1.3695E+00 | 3.1122E+00 | −2.5396E+01 | 9.3037E+00 | 6.9406E+00 |
| A4= | 3.0669E−01 | 3.9746E−01 | −6.6273E−02 | −2.7310E−01 | −5.4728E−01 |
| A6= | −1.0692E−01 | 2.4787E−01 | −3.9714E−01 | −1.0256E−01 | 1.5958E−01 |
| A8= | 6.4269E−01 | −1.1068E+00 | 9.6898E−01 | −9.4771E−01 | −3.1592E−01 |
| A10= | −1.0043E+00 | 4.9635E+00 | −4.1693E+00 | 9.7786E−02 | 3.6403E−02 |
| A12= | 1.2690E+00 | −2.5309E−01 | 1.7581E−01 | −3.8988E−01 | 4.1138E−01 |
| A14= | −3.5170E−02 | 3.6907E−04 | −5.1797E−02 | −2.4819E−02 | −2.5755E−02 |

| Surface # | 7 | 8 | 9 | 10 | 11 |
|---|---|---|---|---|---|
| k= | −2.9801E+01 | 2.8805E+01 | −3.4548E+00 | −5.9883E+00 | −3.3627E+00 |
| A4= | −1.9930E−01 | 1.1749E−02 | −2.4257E−01 | −1.4270E−01 | −1.3485E−01 |
| A6= | 8.0767E−02 | −3.8239E−02 | 1.4188E−01 | 1.8487E−01 | 4.8508E−02 |
| A8= | 7.9192E−02 | 1.3013E−01 | −7.8171E−02 | −7.0779E−03 | −1.5466E−02 |
| A10= | −5.9066E−02 | −1.1941E−01 | 1.5856E−02 | 1.0242E−03 | 2.9882E−03 |
| A12= | −2.8198E−02 | 4.2781E−02 | −5.2805E−05 | 1.2383E−04 | −2.9077E−04 |
| A14= | 2.0745E−02 | −9.2560E−03 | 2.1322E−03 | −2.6701E−05 | 8.5589E−06 |

The units of the radius of curvature, the thickness and the focal length in table 1 are expressed in mm, in the tables 1 and 2, the surface numbers 0-14 represent the surfaces sequentially arranged from the object-side to the image-side along the optical axis, and in table 2, k represents the conic coefficient of the equation of the aspheric surface profiles, and $A_4$, $A_6$, $A_8$, $A_{10}$, $A_{12}$, $A_{14}$ . . . : represent the high-order aspheric coefficients arranging from the 4th order to the 14th order. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
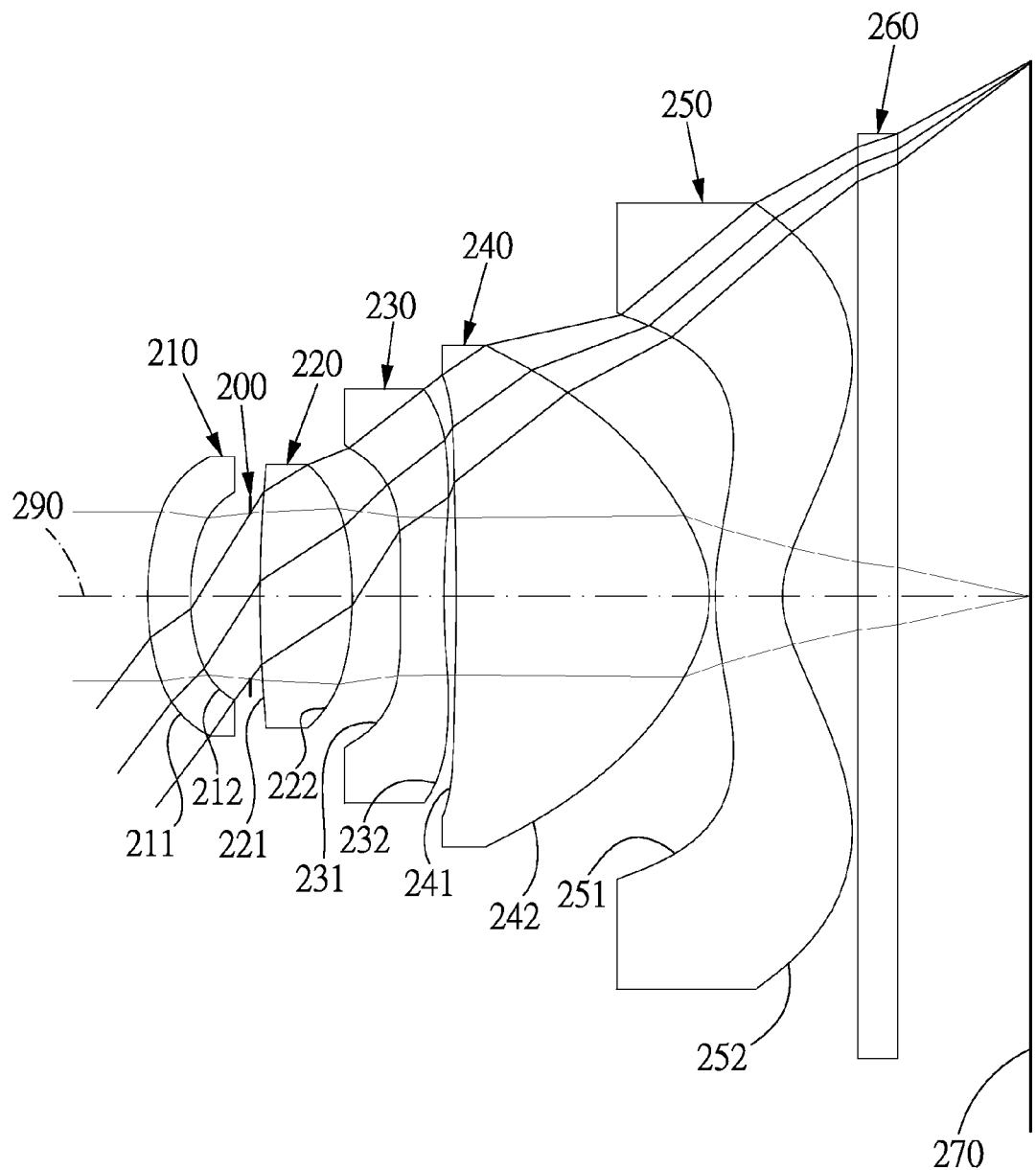
FIG. 2A shows a wide-angle image taking lens system in accordance with a second embodiment of the present invention.
Figure 2B:
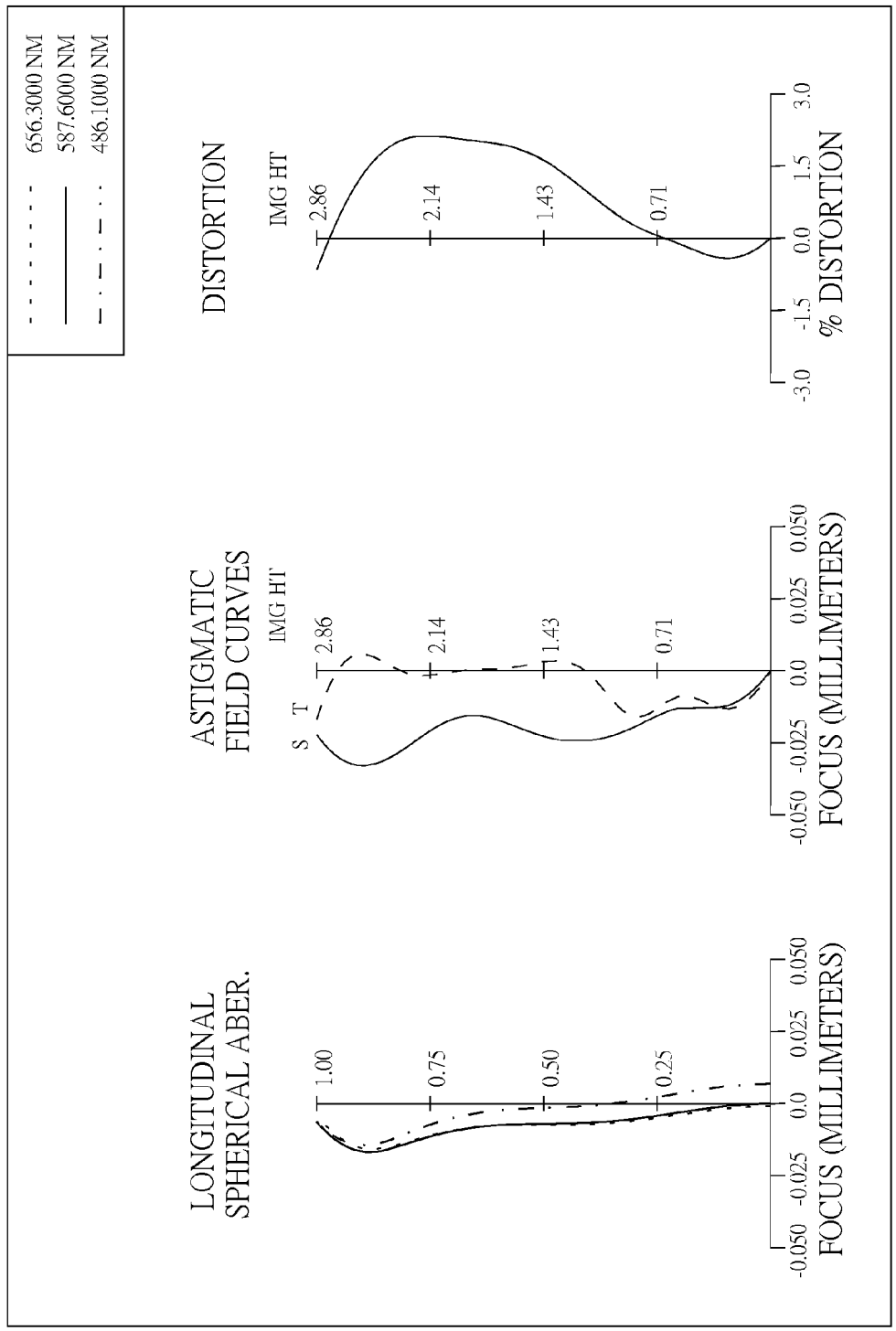
FIG. 2B shows the longitudinal spherical aberration curve, the astigmatic field curve and the distortion curve of the second embodiment of the present invention.

FIG. 2A shows a wide-angle image taking lens system in accordance with a second embodiment of the present invention, and FIG. 2B shows, in order from left to right, the longitudinal spherical aberration curves, the astigmatic field curves, and the distortion curve of the second embodiment of the present invention. A wide-angle image taking lens system in accordance with the second embodiment of the present invention comprises an aperture stop 200 and an optical assembly. The optical assembly comprises, in order from an object side to an image side: a first lens element 210, a second lens element 220, a third lens element 230, a fourth lens element 240, a fifth lens element 250, an IR cut filter 260 and an image plane 270, wherein the wide-angle image taking lens system has a total of five lens elements with refractive power. The aperture stop 200 is located between an image-side surface 212 of the first lens element 210 and an image-side surface 222 of the second lens element 220.

The first lens element 210 with a negative refractive power has an object-side surface 211 being convex near an optical axis 290 and the image-side surface 212 being concave near the optical axis 290, both the object-side and image-side surfaces 211, 212 are aspheric, and the first lens element 210 is made of plastic material.

The second lens element 220 with a positive refractive power has an object-side surface 221 being convex near the optical axis 290 and the image-side surface 222 being convex near the optical axis 290, both the object-side and image-side surfaces 221, 222 are aspheric, and the second lens element 220 is made of plastic material.

The third lens element 230 with a negative refractive power has an object-side surface 231 being convex near the optical axis 290 and an image-side surface 232 being concave near the optical axis 290, both the object-side and image-side surfaces 231, 232 are aspheric, and the third lens element 230 is made of plastic material.

The fourth lens element 240 with a positive refractive power has an object-side surface 241 being concave near the optical axis 290 and an image-side surface 242 being convex near the optical axis 290, both the object-side and image-side surfaces 241, 242 are aspheric, and the fourth lens element 240 is made of plastic material.

The fifth lens element 250 with a negative refractive power has an object-side surface 251 being convex near the optical axis 290 and an image-side surface 252 being concave near the optical axis 290, both the object-side and image-side surfaces 251, 252 are aspheric, the fifth lens element 250 is made of plastic material, and more than one inflection point is formed on the object-side surface 251 and the image-side surface 252 of the fifth lens element 250.

The IR cut filter 260 made of glass is located between the fifth lens element 250 and the image plane 270 and has no influence on the focal length of the wide-angle image taking lens system.

The detailed optical data of the second embodiment is shown in Table 3 and the aspheric surface data is shown in Table 4 below.

TABLE 3

(Embodiment 2)
f(focal length) = 2.163 mm, Fno = 2.4, HFOV = 52.86 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.8482(ASP) | 0.23 | Plastic | 1.515 | 57.0 | −10.69 |
| 2 | | 1.3248(ASP) | 0.32 | | | | |

TABLE 3-continued (Embodiment 2)
f(focal length) = 2.163 mm, Fno = 2.4, HFOV = 52.86 deg.

| Surface | | Curvature Radius | Thickness | Material | index | Abbe # | Focal length |
|---|---|---|---|---|---|---|---|
| 3 | Aperture stop | Plane | 0.05 | | | | |
| 4 | Lens 2 | 6.5300(ASP) | 0.49 | Plastic | 1.515 | 57.0 | 3.11 |
| 5 | | −2.0698(ASP) | 0.26 | | | | |
| 6 | Lens 3 | 16.6119(ASP) | 0.23 | Plastic | 1.632 | 23.0 | −5.12 |
| 7 | | 2.6939(ASP) | 0.07 | | | | |
| 8 | Lens 4 | −15.9715(ASP) | 1.35 | Plastic | 1.544 | 56.5 | 1.07 |
| 9 | | −0.5772(ASP) | 0.03 | | | | |
| 10 | Lens 5 | 1.4757(ASP) | 0.36 | Plastic | 1.632 | 23.0 | −1.35 |
| 11 | | 0.4911(ASP) | 0.40 | | | | |
| 12 | IR-filter | Plane | 0.21 | Glass | 1.517 | 64.2 | |
| 13 | | Plane | 0.71 | | | | |
| 14 | Image | Plane | | | | | |

TABLE 4

Aspheric Coefficients

| Surface # | 1 | 2 | 4 | 5 | 6 |
|---|---|---|---|---|---|
| k= | −2.4155E+00 | 4.3215E+00 | 1.6753E+01 | 1.7715E+00 | −3.0000E+00 |
| A4= | 4.3306E−01 | 4.1550E−01 | −2.5145E−02 | −2.9656E−01 | −6.2366E−01 |
| A6= | −1.4885E−01 | 3.4390E−01 | −6.7584E−02 | −2.2997E−01 | 7.3183E−02 |
| A8= | 1.2506E+00 | −2.3323E+00 | 4.8360E−01 | −2.5793E−01 | −3.1189E−01 |
| A10= | −2.4139E+00 | 1.0177E+01 | −8.2164E−01 | 4.1295E−01 | −5.1903E−01 |
| A12= | 3.2734E+00 | −2.5367E−01 | 1.7669E−01 | −3.6239E−01 | 4.1266E−01 |
| A14= | −3.6504E−02 | 3.9616E−04 | −5.1647E−02 | −2.4597E−02 | −2.5890E−02 |

| Surface # | 7 | 8 | 9 | 10 | 11 |
|---|---|---|---|---|---|
| k= | −3.0000E+01 | 3.0000E+01 | −3.3274E+00 | −1.0524E+01 | −4.0666E+00 |
| A4= | −2.3039E−01 | 4.5978E−02 | −2.8143E−01 | −1.1192E−01 | −1.2128E−01 |
| A6= | 8.0976E−02 | −8.3711E−02 | 1.7779E−01 | −2.1370E−02 | 4.2315E−02 |
| A8= | 3.3504E−02 | 1.0188E−01 | −1.0923E−01 | 1.2791E−02 | −1.4831E−02 |
| A10= | −5.7833E−02 | −1.0547E−01 | 2.0706E−02 | −7.0131E−03 | 2.9882E−03 |
| A12= | 1.7877E−02 | 5.9920E−02 | 5.4351E−03 | 1.2383E−04 | −2.9077E−04 |
| A14= | −5.8781E−03 | −1.6081E−02 | −1.7319E−03 | −2.6701E−05 | 8.5589E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| Embodiment 2 | | | |
|---|---|---|---|
| Fno | 2.4 | f2/f | 1.44 |
| FOV | 105.7 | R3/f | 3.02 |
| V1/V5 | 2.48 | CT4/CT5 | 3.78 |
| T12/CT1 | 1.60 | f5/f1 | 0.13 |
| \| f/f3 \| + \| f/f2 \| | 1.12 | T12*10/f | 1.71 |
| CA11/CA52 | 0.36 | \| f/f3 \| | 0.42 |
| (CT2 + CT4)/(CT1 + CT3) | 4.00 | | |

Figure 3A:
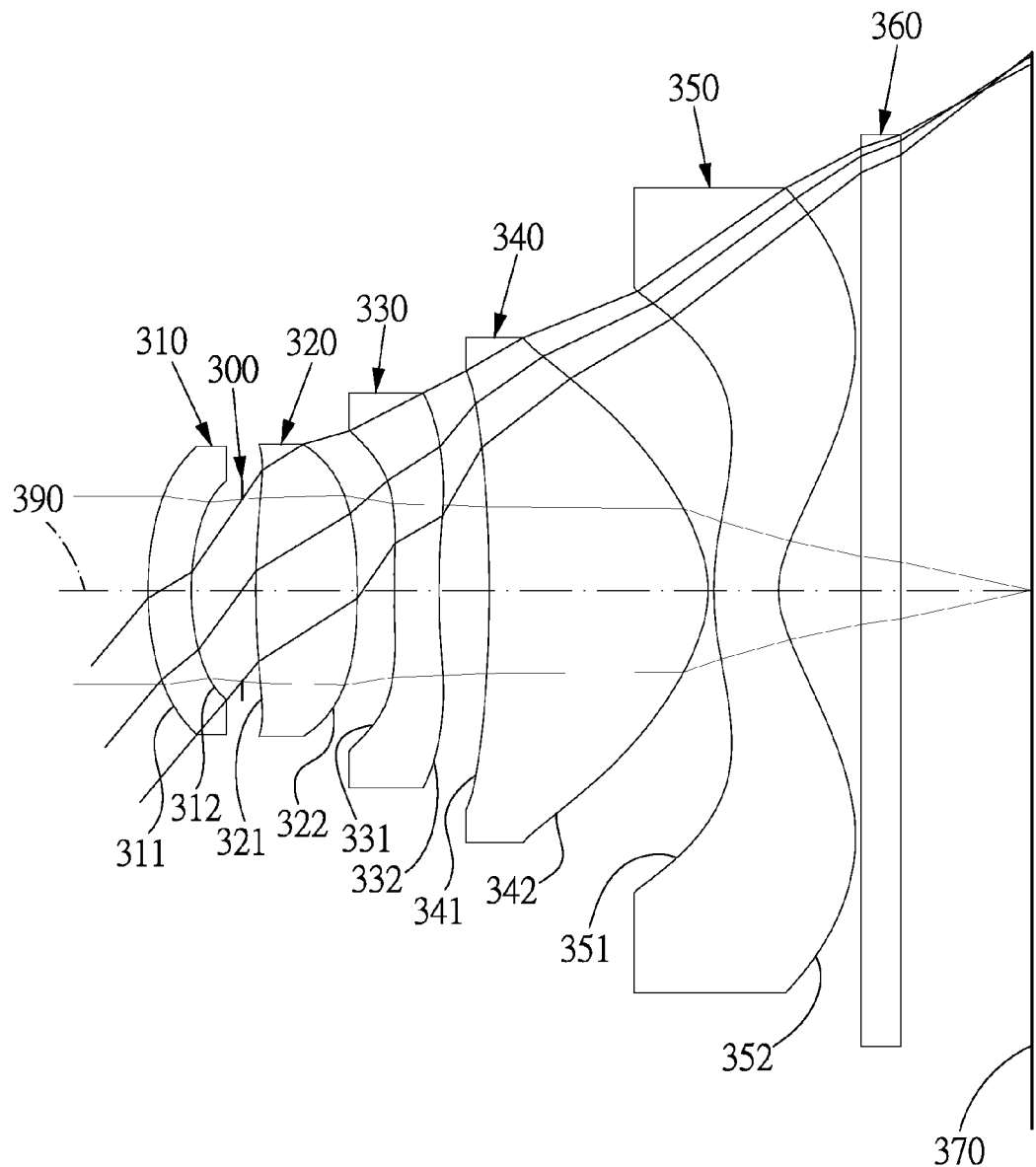
FIG. 3A shows a wide-angle image taking lens system in accordance with a third embodiment of the present invention.
Figure 3B:
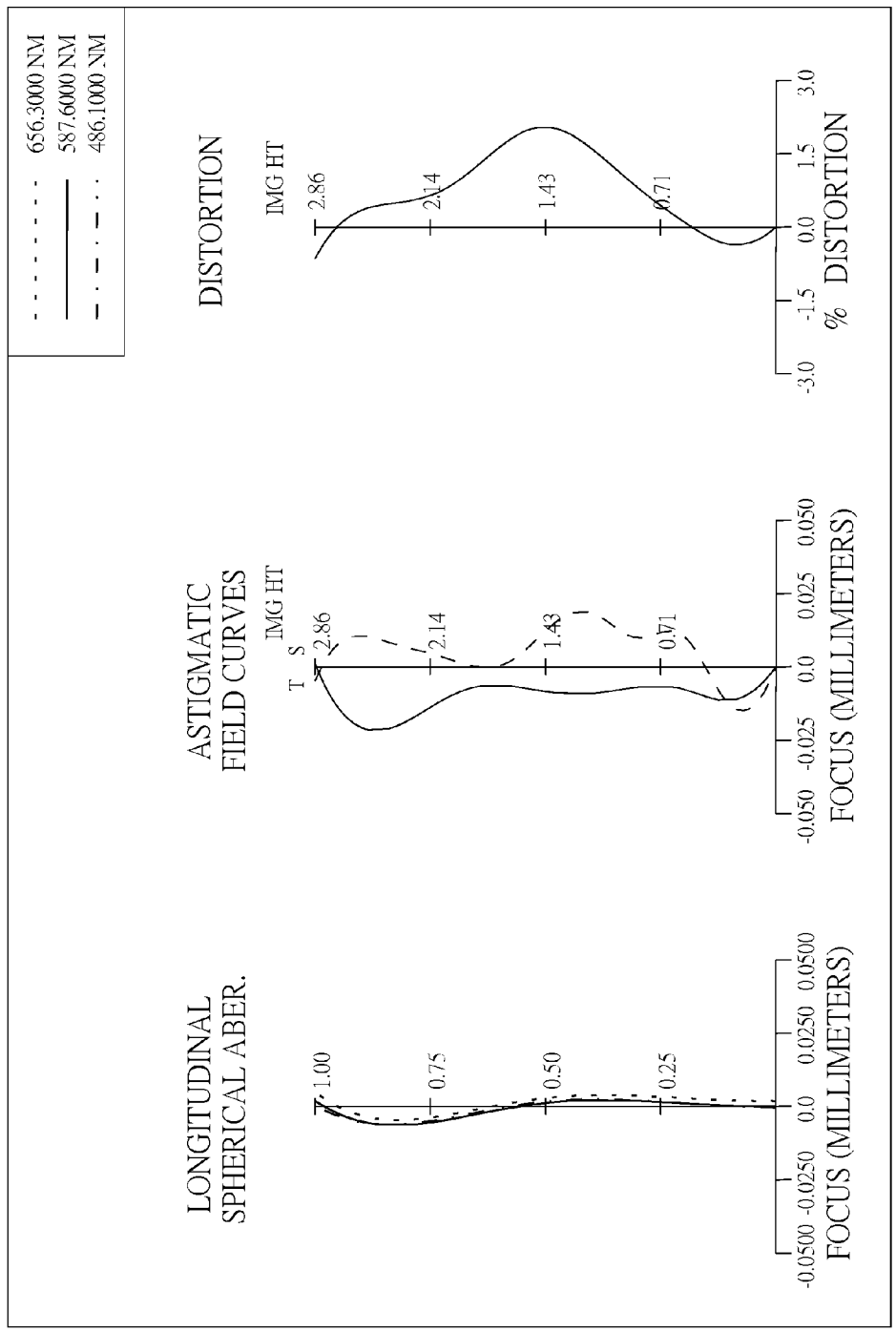
FIG. 3B shows the longitudinal spherical aberration curve, the astigmatic field curve and the distortion curve of the third embodiment of the present invention.

FIG. 3A shows a wide-angle image taking lens system in accordance with a third embodiment of the present invention, and FIG. 3B shows, in order from left to right, the longitudinal spherical aberration curves, the astigmatic field curves, and the distortion curve of the third embodiment of the present invention. A wide-angle image taking lens system in accordance with the third embodiment of the present invention comprises an aperture stop 300 and an optical assembly. The optical assembly comprises, in order from an object side to an image side: a first lens element 310, a second lens element 320, a third lens element 330, a fourth lens element 340, a fifth lens element 350, an IR cut filter 360 and an image plane 370, wherein the wide-angle image taking lens system has a total of five lens elements with refractive power. The aperture stop 300 is located between an image-side surface 312 of the first lens element 310 and an image-side surface 322 of the second lens element 320.

The first lens element 310 with a negative refractive power has an object-side surface 311 being convex near an optical axis 390 and the image-side surface 312 being concave near the optical axis 390, both the object-side and image-side surfaces 311, 312 are aspheric, and the first lens element 310 is made of plastic material.

The second lens element 320 with a positive refractive power has an object-side surface 321 being convex near the optical axis 390 and the image-side surface 322 being convex near the optical axis 390, both the object-side and image-side surfaces 321, 322 are aspheric, and the second lens element 320 is made of plastic material.

The third lens element 330 with a negative refractive power has an object-side surface 331 being convex near the optical axis 390 and an image-side surface 332 being concave near the optical axis 390, both the object-side and image-side surfaces 331, 332 are aspheric, and the third lens element 330 is made of plastic material.

The fourth lens element 340 with a positive refractive power has an object-side surface 341 being concave near the optical axis 390 and an image-side surface 342 being convex near the optical axis 390, both the object-side and image-side surfaces 341, 342 are aspheric, and the fourth lens element 340 is made of plastic material.

The fifth lens element 350 with a negative refractive power has an object-side surface 351 being convex near the optical axis 390 and an image-side surface 352 being concave near the optical axis 390, both the object-side and image-side surfaces 351, 352 are aspheric, the fifth lens element 350 is made of plastic material, and more than one inflection point is formed on the object-side surface 351 and the image-side surface 352 of the fifth lens element 350.

The IR cut filter 360 made of glass is located between the fifth lens element 350 and the image plane 370 and has no influence on the focal length of the wide-angle image taking lens system.

The detailed optical data of the third embodiment is shown in Table 5 and the aspheric surface data is shown in Table 6 below.

TABLE 5

(Embodiment 3)
f(focal length) = 2.4 mm, Fno = 2.4, HFOV = 49.97 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 2.1318(ASP) | 0.23 | Plastic | 1.515 | 57.0 | −17.74 |
| 2 | | 1.6648(ASP) | 0.27 | | | | |
| 3 | Aperture stop | Plane | 0.07 | | | | |
| 4 | Lens 2 | 4.9105(ASP) | 0.54 | Plastic | 1.515 | 57.0 | 3.70 |
| 5 | | −2.9953(ASP) | 0.20 | | | | |
| 6 | Lens 3 | 5.6568(ASP) | 0.24 | Plastic | 1.632 | 23.0 | −11.05 |
| 7 | | 3.0746(ASP) | 0.27 | | | | |
| 8 | Lens 4 | −6.4527(ASP) | 1.16 | Plastic | 1.544 | 56.5 | 1.15 |
| 9 | | −0.6086(ASP) | 0.03 | | | | |
| 10 | Lens 5 | 1.4005(ASP) | 0.35 | Plastic | 1.632 | 23.0 | −1.34 |
| 11 | | 0.4781(ASP) | 0.44 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 6

Aspheric Coefficients

| Surface # | 1 | 2 | 4 | 5 | 6 |
|---|---|---|---|---|---|
| k= | 3.6292E+00 | 5.2883E+00 | −3.0000E+01 | 1.2634E+01 | 2.8391E+01 |
| A4= | 2.3093E−01 | 3.6528E−01 | 5.0213E−02 | −3.0113E−01 | −6.1676E−01 |
| A6= | −3.9363E−02 | −2.4901E−01 | −1.5424E−01 | −1.7102E−02 | 1.9099E−01 |
| A8= | 1.6747E−01 | 1.4982E+00 | 2.8962E−01 | −3.7925E−01 | −7.4186E−01 |
| A10= | 1.3449E−01 | −7.6909E−01 | −8.5268E−01 | 5.5367E−01 | 3.8272E−01 |
| A12= | −1.5920E−01 | −2.5365E−01 | 1.7954E−01 | −3.6214E−01 | 4.0878E−01 |
| A14= | −3.5418E−02 | 3.8831E−04 | −5.1747E−02 | −2.4089E−02 | −2.6115E−02 |

| Surface # | 7 | 8 | 9 | 10 | 11 |
|---|---|---|---|---|---|
| k= | −3.0000E+01 | 2.8353E+01 | −3.5238E+00 | −9.8845E+01 | −3.7500E+00 |
| A4= | −2.1902E−01 | 4.7444E−02 | −2.3709E−01 | −1.4382E−01 | −1.2168E−01 |
| A6= | 1.1433E−02 | −7.9134E−02 | 1.4287E−01 | 1.0046E−02 | 4.3443E−02 |
| A8= | 7.5055E−02 | 1.2317E−01 | −8.1152E−02 | −7.2829E−03 | −1.4592E−02 |
| A10= | −3.2877E−02 | −1.0652E−01 | 1.9586E−02 | 2.2188E−03 | 2.9882E−03 |
| A12= | −1.6719E−03 | 5.1290E−02 | 1.6770E−03 | 1.2383E−04 | −2.9077E−04 |
| A14= | −2.7830E−03 | −1.0772E−02 | 8.6163E−05 | −2.6701E−05 | 8.5589E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| Embodiment 3 | | | |
|---|---|---|---|
| Fno | 2.4 | f2/f | 1.54 |
| FOV | 99.9 | R3/f | 2.05 |
| V1/V5 | 2.48 | CT4/CT5 | 3.36 |
| T12/CT1 | 1.49 | f5/f1 | 0.08 |
| \| f/f3 \| + \| f/f2 \| | 0.87 | T12*10/f | 1.43 |
| CA11/CA52 | 0.36 | \| f/f3 \| | 0.22 |
| (CT2 + CT4)/(CT1 + CT3) | 3.64 | | |

Figure 4A:
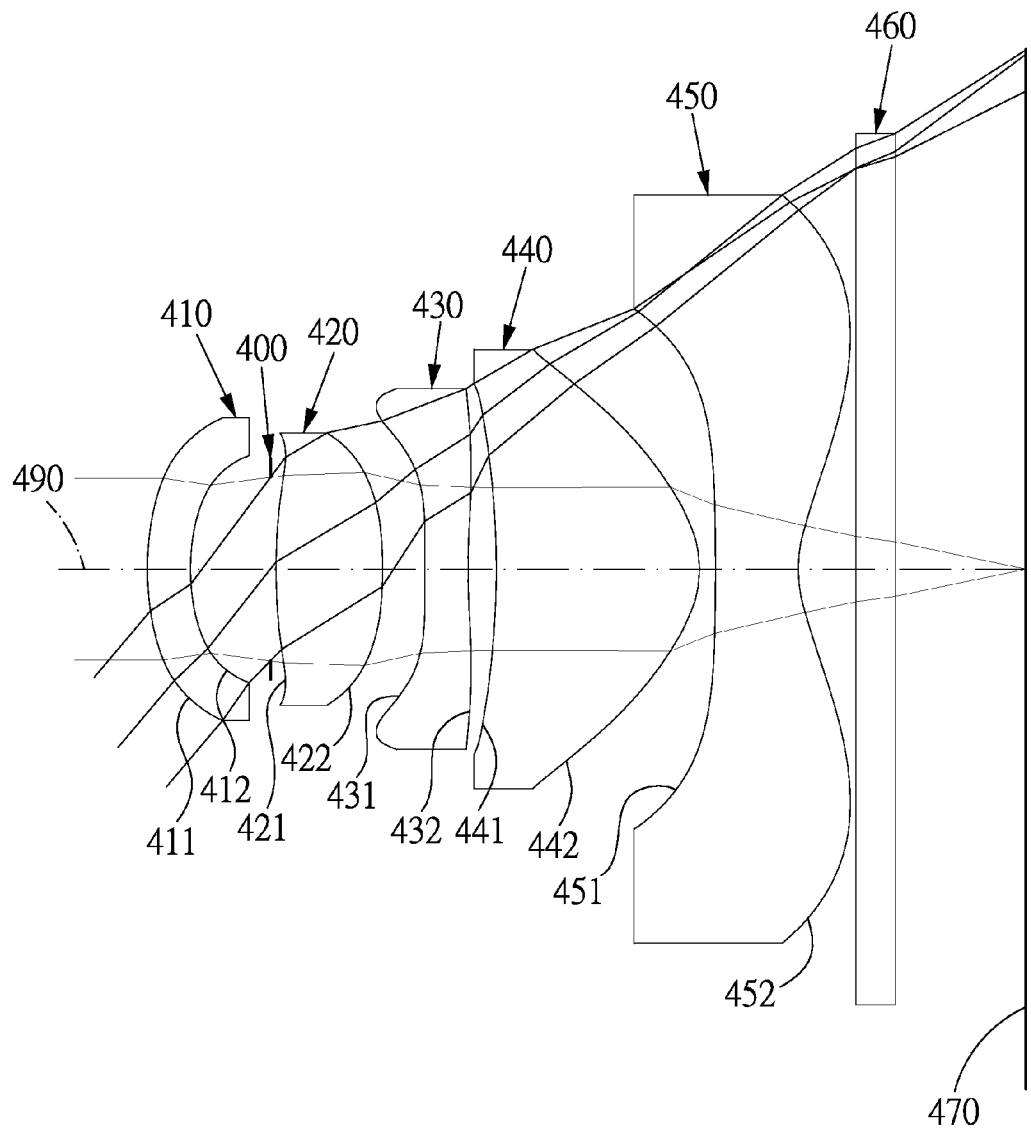
FIG. 4A shows a wide-angle image taking lens system in accordance with a fourth embodiment of the present invention.
Figure 4B:
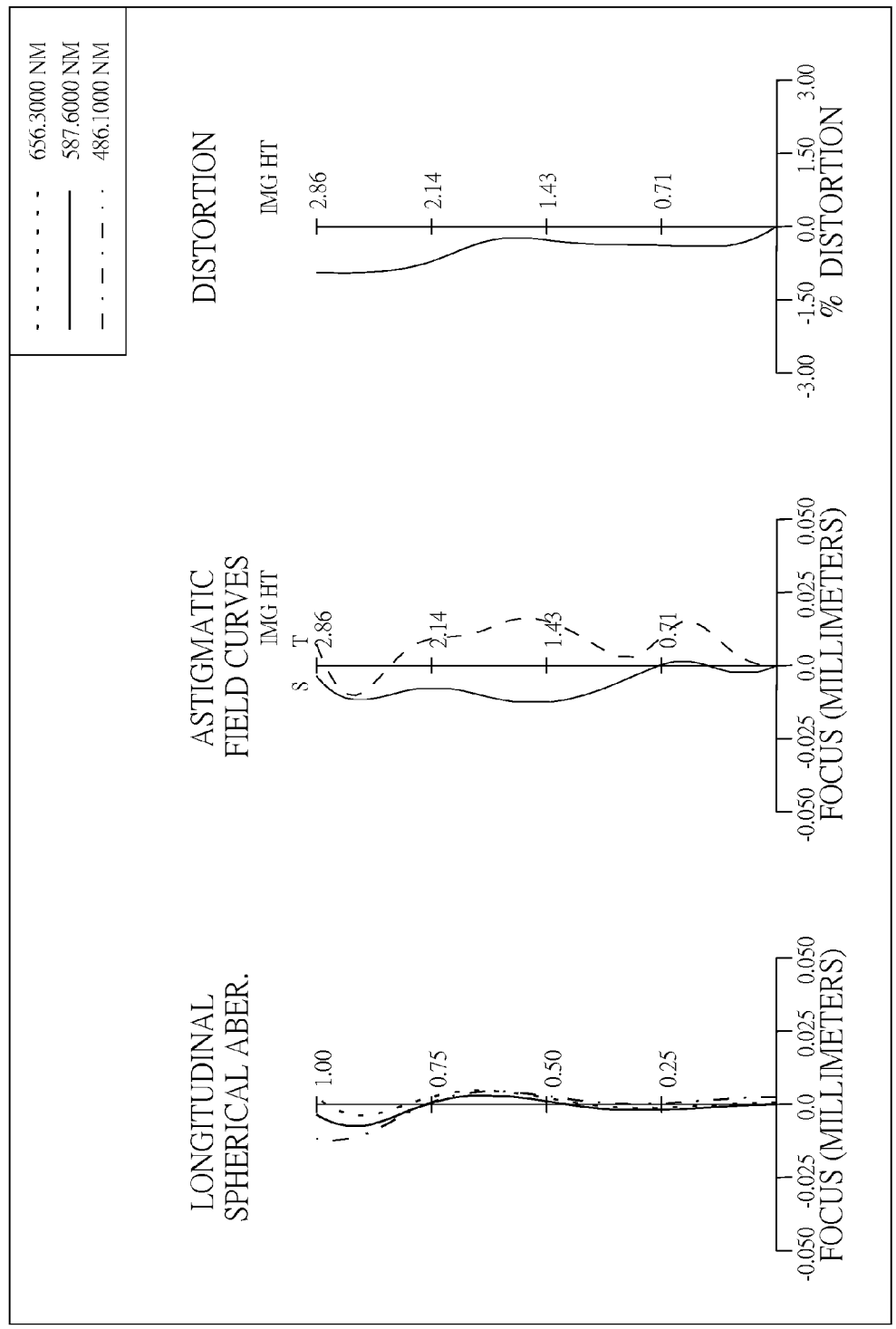
FIG. 4B shows the longitudinal spherical aberration curve, the astigmatic field curve and the distortion curve of the fourth embodiment of the present invention.

FIG. 4A shows a wide-angle image taking lens system in accordance with a fourth embodiment of the present invention, and FIG. 4B shows, in order from left to right, the longitudinal spherical aberration curves, the astigmatic field curves, and the distortion curve of the fourth embodiment of the present invention. A wide-angle image taking lens system in accordance with the fourth embodiment of the present invention comprises an aperture stop 400 and an optical assembly. The optical assembly comprises, in order from an object side to an image side: a first lens element 410, a second lens element 420, a third lens element 430, a fourth lens element 440, a fifth lens element 450, an IR cut filter 460 and an image plane 470, wherein the wide-angle image taking lens system has a total of five lens elements with refractive power. The aperture stop 400 is located between an image-side surface 412 of the first lens element 410 and an image-side surface 422 of the second lens element 420.

The first lens element 410 with a negative refractive power has an object-side surface 411 being convex near an optical axis 490 and the image-side surface 412 being concave near the optical axis 490, both the object-side and image-side surfaces 411, 412 are aspheric, and the first lens element 410 is made of plastic material.

The second lens element 420 with a positive refractive power has an object-side surface 421 being convex near the optical axis 490 and the image-side surface 422 being convex near the optical axis 490, both the object-side and image-side surfaces 421, 422 are aspheric, and the second lens element 420 is made of plastic material.

The third lens element 430 with a negative refractive power has an object-side surface 431 being convex near the optical axis 490 and an image-side surface 432 being concave near the optical axis 490, both the object-side and image-side surfaces 431, 432 are aspheric, and the third lens element 430 is made of plastic material.

The fourth lens element 440 with a positive refractive power has an object-side surface 441 being concave near the optical axis 490 and an image-side surface 442 being convex near the optical axis 490, both the object-side and image-side surfaces 441, 442 are aspheric, and the fourth lens element 440 is made of plastic material.

The fifth lens element 450 with a negative refractive power has an object-side surface 451 being concave near the optical axis 490 and an image-side surface 452 being concave near the optical axis 490, both the object-side and image-side surfaces 451, 452 are aspheric, the fifth lens element 450 is made of plastic material, and more than one inflection point is formed on the image-side surface 452 of the fifth lens element 450.

The IR cut filter 460 made of glass is located between the fifth lens element 450 and the image plane 470 and has no influence on the focal length of the wide-angle image taking lens system.

The detailed optical data of the fourth embodiment is shown in Table 7 and the aspheric surface data is shown in Table 8 below.

TABLE 7

(Embodiment 4)
f(focal length) = 2.38 mm, Fno = 2.4, HFOV = 50.21 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 2.0000(ASP) | 0.23 | Plastic | 1.515 | 57.0 | −9.11 |
| 2 | | 1.3473(ASP) | 0.43 | | | | |
| 3 | Aperture stop | Plane | 0.03 | | | | |
| 4 | Lens 2 | 2.8989(ASP) | 0.57 | Plastic | 1.515 | 57.0 | 2.53 |
| 5 | | −2.1968(ASP) | 0.23 | | | | |
| 6 | Lens 3 | 23.1429(ASP) | 0.23 | Plastic | 1.632 | 23.0 | −5.93 |
| 7 | | 3.2160(ASP) | 0.15 | | | | |
| 8 | Lens 4 | −5.8605(ASP) | 1.09 | Plastic | 1.544 | 56.5 | 1.03 |
| 9 | | −0.5447(ASP) | 0.09 | | | | |
| 10 | Lens 5 | −22.0000(ASP) | 0.44 | Plastic | 1.585 | 30.0 | −1.08 |
| 11 | | 0.6575(ASP) | 0.31 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 8

Aspheric Coefficients

| Surface # | 1 | 2 | 4 | 5 | 6 |
|---|---|---|---|---|---|
| k= | −3.1326E+00 | 3.4732E+00 | −3.0000E+01 | 7.0650E+00 | 1.0575E+01 |
| A4= | 3.6862E−01 | 3.6133E−01 | 1.4842E−01 | −3.3346E−01 | −6.3858E−01 |
| A6= | −6.8063E−03 | 4.0122E−01 | −4.8325E−01 | −5.6205E−02 | −1.5397E−01 |
| A8= | 2.4616E−01 | −1.8226E+00 | 9.6784E−01 | 2.3286E−02 | 1.3190E−01 |
| A10= | −2.5101E−01 | 5.8882E+00 | −2.0668E+00 | 3.4850E−01 | 1.6700E−01 |
| A12= | 6.2903E−01 | −2.5308E−01 | 1.7581E−01 | −3.7546E−01 | 4.0090E−01 |
| A14= | −3.5169E−02 | 3.6931E−04 | −5.1799E−02 | −2.4824E−02 | −2.5759E−02 |

| Surface # | 7 | 8 | 9 | 10 | 11 |
|---|---|---|---|---|---|
| k= | −3.0000E+01 | 3.0000E+01 | −3.0291E+00 | −9.7609E+00 | −6.6916E+00 |
| A4= | −3.0078E−01 | −1.4779E−01 | −3.2226E−01 | −7.0139E−02 | −9.3248E−02 |
| A6= | 2.1277E−01 | 3.8312E−01 | 2.8383E−01 | 4.8129E−03 | 3.9040E−02 |
| A8= | 8.7897E−02 | −2.5054E−01 | −1.8942E−01 | −1.3622E−02 | −1.4803E−02 |
| A10= | −1.0477E−01 | −6.2414E−02 | 3.1530E−02 | 2.0930E−03 | 2.9882E−03 |
| A12= | −9.0476E−02 | 1.7206E−01 | 3.1717E−02 | 1.2383E−04 | −2.9077E−04 |
| A14= | 7.8254E−02 | −7.7755E−02 | −9.5732E−03 | −2.6701E−05 | 8.5589E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| Embodiment 4 | | | |
|---|---|---|---|
| Fno | 2.4 | f2/f | 1.06 |
| FOV | 100.4 | R3/f | 1.22 |
| V1/V5 | 1.90 | CT4/CT5 | 2.46 |
| T12/CT1 | 1.99 | f5/f1 | 0.12 |
| \| f/f3 \| + \| f/f2 \| | 1.34 | T12*10/f | 1.92 |
| CA11/CA52 | 0.41 | \| f/f3 \| | 0.40 |
| (CT2 + CT4)/(CT1 + CT3) | 3.61 | | |

Figure 5A:
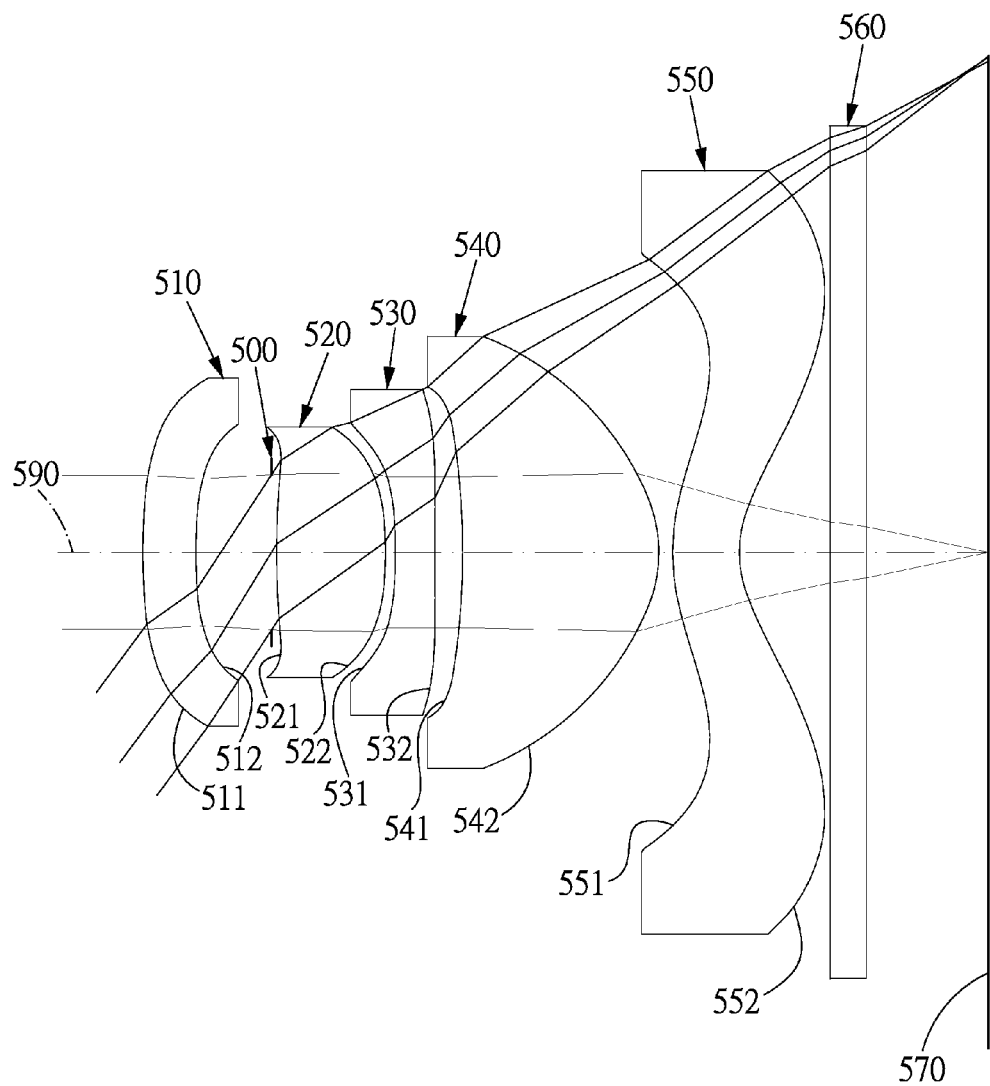
FIG. 5A shows a wide-angle image taking lens system in accordance with a fifth embodiment of the present invention.
Figure 5B:
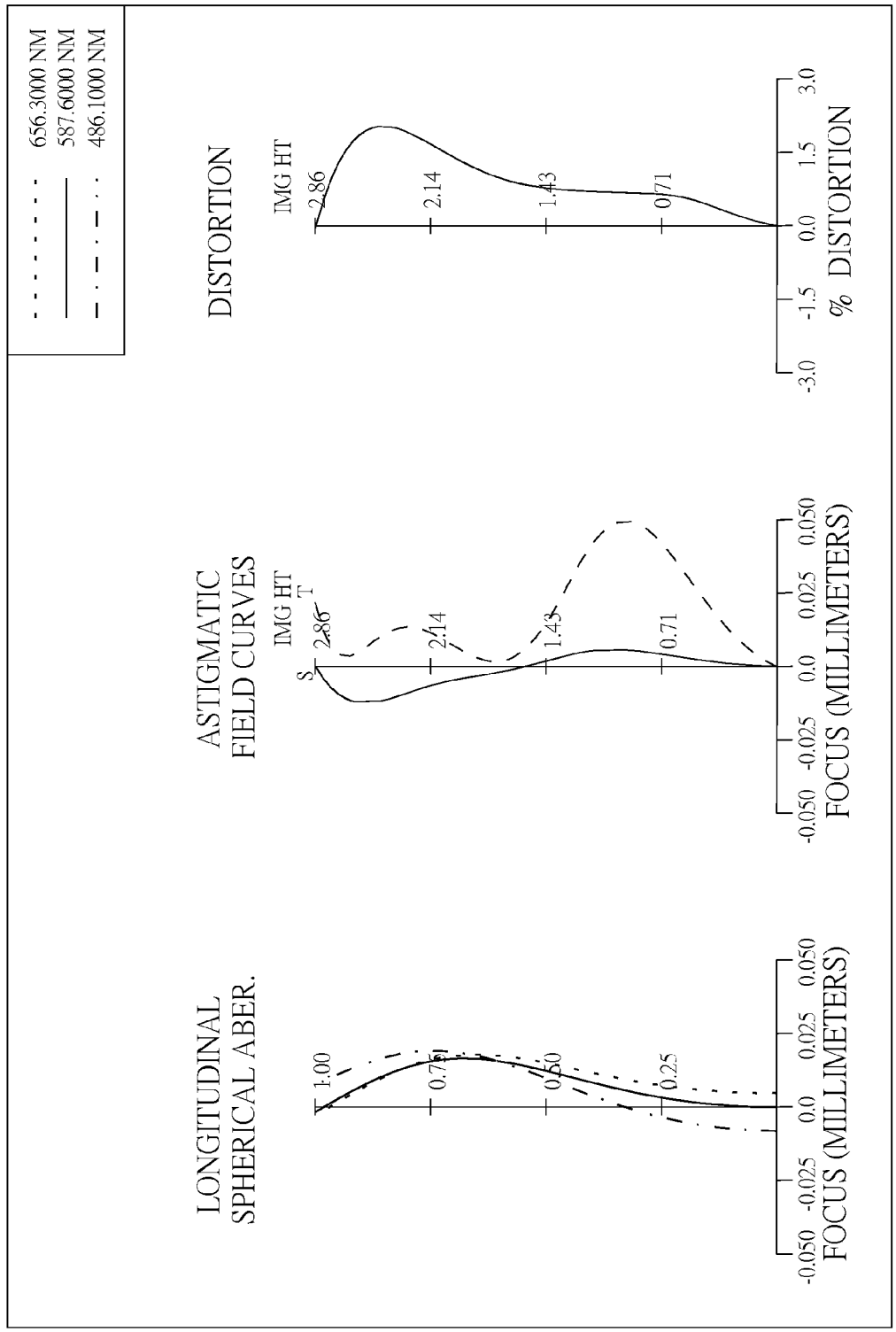
FIG. 5B shows the longitudinal spherical aberration curve, the astigmatic field curve and the distortion curve of the fifth embodiment of the present invention.

FIG. 5A shows a wide-angle image taking lens system in accordance with a fifth embodiment of the present invention, and FIG. 5B shows, in order from left to right, the longitudinal spherical aberration curves, the astigmatic field curves, and the distortion curve of the fifth embodiment of the present invention. A wide-angle image taking lens system in accordance with the fifth embodiment of the present invention comprises an aperture stop 500 and an optical assembly. The optical assembly comprises, in order from an object side to an image side: a first lens element 510, a second lens element 520, a third lens element 530, a fourth lens element 540, a fifth lens element 550, an IR cut filter 560 and an image plane 570, wherein the wide-angle image taking lens system has a total of five lens elements with refractive power. The aperture stop 500 is located between an image-side surface 512 of the first lens element 510 and an image-side surface 522 of the second lens element 520.

The first lens element 510 with a negative refractive power has an object-side surface 511 being convex near an optical axis 590 and the image-side surface 512 being concave near the optical axis 590, both the object-side and image-side surfaces 511, 512 are aspheric, and the first lens element 510 is made of plastic material.

The second lens element 520 with a positive refractive power has an object-side surface 521 being convex near the optical axis 590 and the image-side surface 522 being convex near the optical axis 590, both the object-side and image-side surfaces 521, 522 are aspheric, and the second lens element 520 is made of plastic material.

The third lens element 530 with a negative refractive power has an object-side surface 531 being concave near the optical axis 590 and an image-side surface 532 being concave near the optical axis 590, both the object-side and image-side surfaces 531, 532 are aspheric, and the third lens element 530 is made of plastic material.

The fourth lens element 540 with a positive refractive power has an object-side surface 541 being concave near the optical axis 590 and an image-side surface 542 being convex near the optical axis 590, both the object-side and image-side surfaces 541, 542 are aspheric, and the fourth lens element 540 is made of plastic material.

The fifth lens element 550 with a negative refractive power has an object-side surface 551 being convex near the optical axis 590 and an image-side surface 552 being concave near the optical axis 590, both the object-side and image-side surfaces 551, 552 are aspheric, the fifth lens element 550 is made of plastic material, and more than one inflection point is formed on the object-side surface 551 and the image-side surface 552 of the fifth lens element 550.

The IR cut filter 560 made of glass is located between the fifth lens element 550 and the image plane 570 and has no influence on the focal length of the wide-angle image taking lens system.

The detailed optical data of the fifth embodiment is shown in Table 9 and the aspheric surface data is shown in Table 10 below.

TABLE 9

(Embodiment 5)
f(focal length) = 2.12 mm, Fno = 2.4, HFOV = 53.36 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 5.9468(ASP) | 0.31 | Plastic | 1.544 | 56.5 | −14.32 |
| 2 | | 3.3116(ASP) | 0.44 | | | | |
| 3 | Aperture stop | Plane | 0.03 | | | | |
| 4 | Lens 2 | 4.5472(ASP) | 0.63 | Plastic | 1.533 | 55.7 | 3.08 |
| 5 | | −2.4441(ASP) | 0.06 | | | | |
| 6 | Lens 3 | −5.1130(ASP) | 0.23 | Plastic | 1.632 | 23.0 | −6.28 |
| 7 | | 18.0308(ASP) | 0.16 | | | | |
| 8 | Lens 4 | −3.7130(ASP) | 1.14 | Plastic | 1.533 | 56.5 | 1.59 |
| 9 | | −0.7653(ASP) | 0.08 | | | | |
| 10 | Lens 5 | 1.1969(ASP) | 0.39 | Plastic | 1.632 | 23.0 | −2.76 |
| 11 | | 0.6205(ASP) | 0.52 | | | | |
| 12 | IR-filter | Plane | 0.21 | Glass | 1.517 | 64.2 | |
| 13 | | Plane | 0.71 | | | | |
| 14 | Image | Plane | | | | | |

TABLE 10

Aspheric Coefficients

| Surface # | 1 | 2 | 4 | 5 | 6 |
|---|---|---|---|---|---|
| k= | 3.0000E+01 | 4.8101E+00 | −3.0000E+01 | 9.6075E+00 | 3.0000E+01 |
| A4= | 2.2739E−01 | 3.9605E−01 | 5.9132E−02 | −6.1325E−01 | −7.7511E−01 |
| A6= | −9.1043E−02 | −5.9706E−03 | −4.1236E−01 | 1.4540E−01 | 6.6013E−02 |
| A8= | 1.2528E−01 | −2.6657E−01 | 1.4284E+00 | 1.6853E−01 | −1.0751E−01 |
| A10= | −1.1631E−01 | 1.3464E+00 | −4.3955E+00 | −5.2011E−02 | 8.4355E−01 |
| A12= | 1.1656E−01 | −1.2856E−01 | 8.9302E−02 | −1.9808E−01 | 2.0813E−01 |
| A14= | −1.5769E−02 | 1.7483E−04 | −2.3274E−02 | −1.1144E−02 | −1.1581E−02 |

| Surface # | 7 | 8 | 9 | 10 | 11 |
|---|---|---|---|---|---|
| k= | −3.0000E+01 | 1.3802E+01 | −2.7311E+00 | −8.1773E−01 | −2.7328E+00 |
| A4= | −1.2481E−01 | 1.1631E−01 | −1.8964E−01 | −2.7338E−01 | −1.1888E−01 |
| A6= | −1.4909E−02 | 4.1827E−02 | 8.2915E−02 | 7.1521E−02 | 3.9260E−02 |
| A8= | 1.0364E−01 | −1.7449E−01 | −5.3894E−02 | −1.9094E−02 | −1.0479E−02 |
| A10= | −1.3895E−01 | −2.2656E−01 | 1.3613E−02 | 1.8713E−03 | 1.7172E−03 |
| A12= | 2.0055E−02 | 6.1015E−01 | 9.4759E−03 | 6.2918E−05 | −1.4775E−04 |
| A14= | 3.3171E−02 | −3.9226E−01 | −9.4663E−03 | −1.1996E−05 | 3.8452E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| Embodiment 5 | | | |
|---|---|---|---|
| Fno | 2.4 | f2/f | 1.45 |
| FOV | 106.7 | R3/f | 2.14 |
| V1/V5 | 2.43 | CT4/CT5 | 2.93 |
| T12/CT1 | 1.53 | f5/f1 | 0.19 |
| \| f/f3 \| + \| f/f2 \| | 1.03 | T12*10/f | 2.21 |
| CA11/CA52 | 0.46 | \| f/f3 \| | 0.34 |
| (CT2 + CT4)/(CT1 + CT3) | 3.30 | | |

Figure 6A:
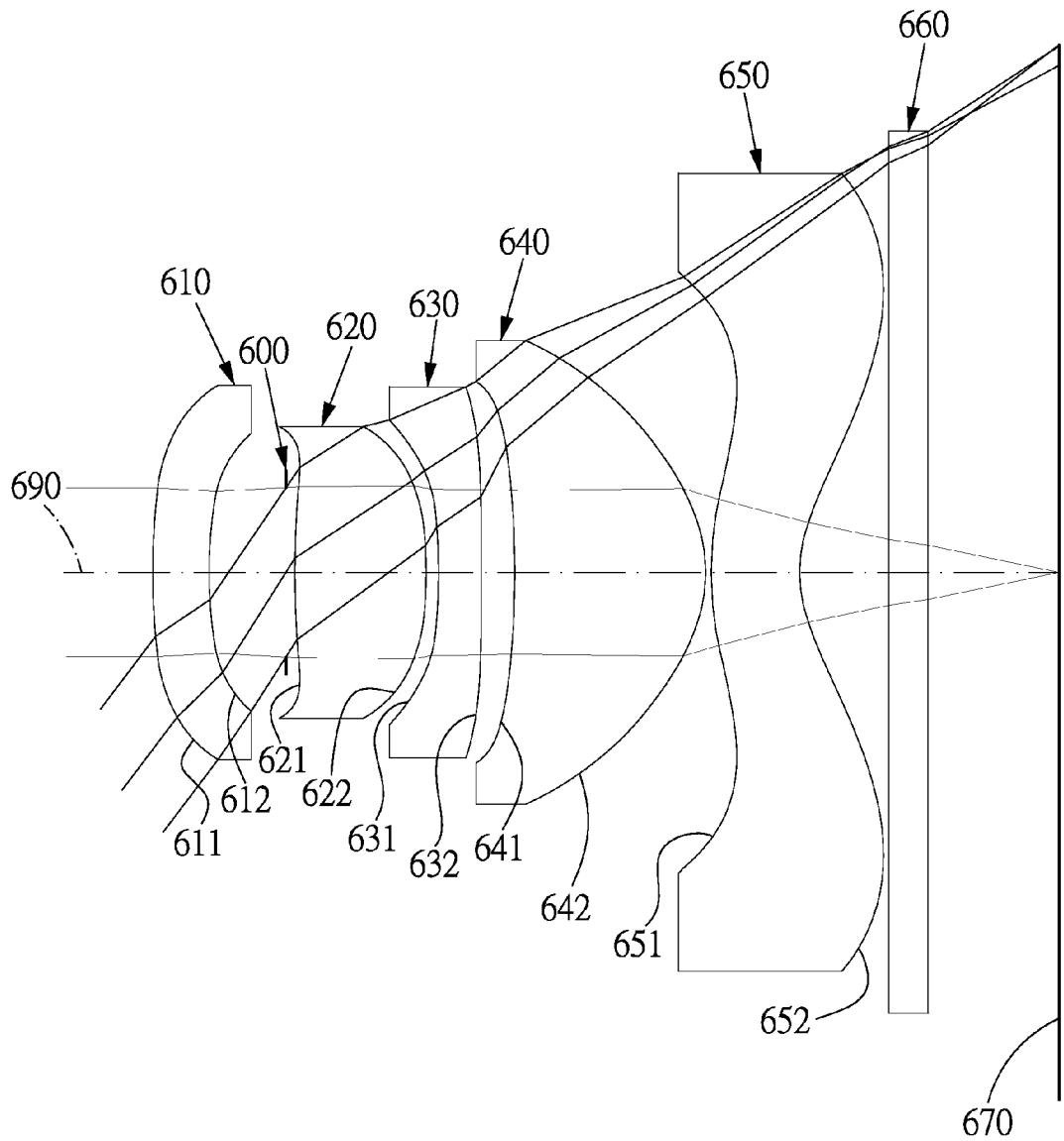
FIG. 6A shows a wide-angle image taking lens system in accordance with a sixth embodiment of the present invention.
Figure 6B:
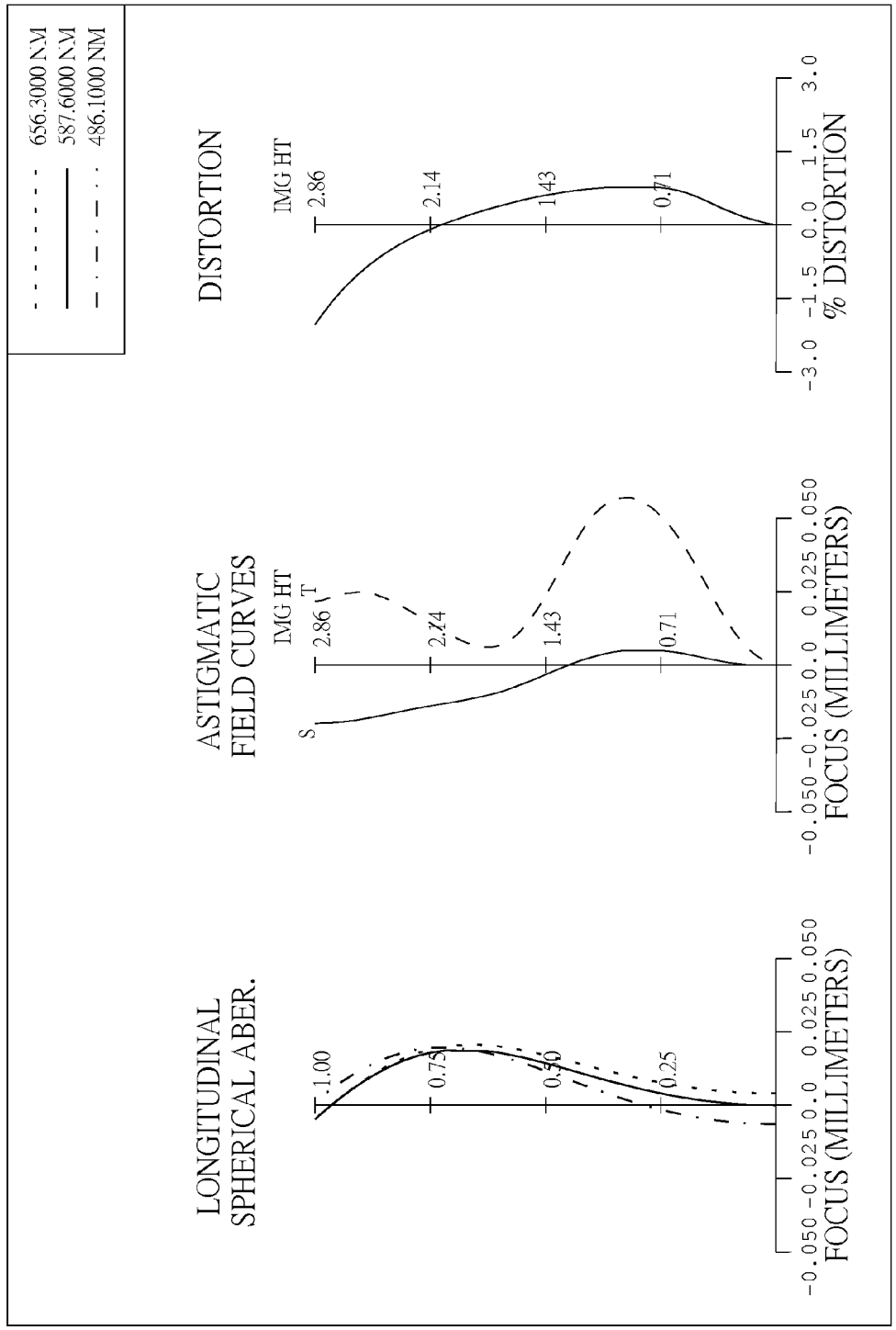
FIG. 6B shows the longitudinal spherical aberration curve, the astigmatic field curve and the distortion curve of the sixth embodiment of the present invention.

FIG. 6A shows a wide-angle image taking lens system in accordance with a sixth embodiment of the present invention, and FIG. 6B shows, in order from left to right, the longitudinal spherical aberration curves, the astigmatic field curves, and the distortion curve of the sixth embodiment of the present invention. A wide-angle image taking lens system in accordance with the sixth embodiment of the present invention comprises an aperture stop 600 and an optical assembly. The optical assembly comprises, in order from an object side to an image side: a first lens element 610, a second lens element 620, a third lens element 630, a fourth lens element 640, a fifth lens element 650, an IR cut filter 660 and an image plane 670, wherein the wide-angle image taking lens system has a total of five lens elements with refractive power. The aperture stop 600 is located between an image-side surface 612 of the first lens element 610 and an image-side surface 622 of the second lens element 620.

The first lens element 610 with a negative refractive power has an object-side surface 611 being convex near an optical axis 690 and the image-side surface 612 being concave near the optical axis 690, both the object-side and image-side surfaces 611, 612 are aspheric, and the first lens element 610 is made of plastic material.

The second lens element 620 with a positive refractive power has an object-side surface 621 being convex near the optical axis 690 and the image-side surface 622 being convex near the optical axis 690, both the object-side and image-side surfaces 621, 622 are aspheric, and the second lens element 620 is made of plastic material.

The third lens element 630 with a negative refractive power has an object-side surface 631 being concave near the optical axis 690 and an image-side surface 632 being convex near the optical axis 690, both the object-side and image-side surfaces 631, 632 are aspheric, and the third lens element 630 is made of plastic material.

The fourth lens element 640 with a positive refractive power has an object-side surface 641 being concave near the optical axis 690 and an image-side surface 642 being convex near the optical axis 690, both the object-side and image-side surfaces 641, 642 are aspheric, and the fourth lens element 640 is made of plastic material.

The fifth lens element 650 with a negative refractive power has an object-side surface 651 being convex near the optical axis 690 and an image-side surface 652 being concave near the optical axis 690, both the object-side and image-side surfaces 651, 652 are aspheric, the fifth lens element 650 is made of plastic material, and more than one inflection point is formed on the object-side surface 651 and the image-side surface 652 of the fifth lens element 650.

The IR cut filter 660 made of glass is located between the fifth lens element 650 and the image plane 670 and has no influence on the focal length of the wide-angle image taking lens system.

The detailed optical data of the sixth embodiment is shown in Table 11 and the aspheric surface data is shown in Table 12 below.

TABLE 11

(Embodiment 6)
f(focal length) = 2.16 mm, Fno = 2.4, HFOV = 52.92 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 5.8543(ASP) | 0.30 | Plastic | 1.544 | 56.5 | −15.73 |
| 2 | | 3.4137(ASP) | 0.41 | | | | |
| 3 | Aperture stop | Plane | 0.05 | | | | |
| 4 | Lens 2 | 4.3915(ASP) | 0.70 | Plastic | 1.515 | 57.0 | 3.38 |
| 5 | | −2.7294(ASP) | 0.07 | | | | |
| 6 | Lens 3 | −5.6168(ASP) | 0.23 | Plastic | 1.632 | 23.0 | −9.45 |
| 7 | | −95.0000(ASP) | 0.18 | | | | |
| 8 | Lens 4 | −3.9399(ASP) | 1.02 | Plastic | 1.544 | 56.5 | 1.54 |
| 9 | | −0.7545(ASP) | 0.03 | | | | |
| 10 | Lens 5 | 1.6393(ASP) | 0.47 | Plastic | 1.632 | 23.0 | −2.31 |
| 11 | | 0.6862(ASP) | 0.48 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 12

Aspheric Coefficients

| Surface # | 1 | 2 | 4 | 5 | 6 |
|---|---|---|---|---|---|
| k= | 3.0000E+01 | 7.1623E+00 | −2.6124E+01 | 1.0523E+01 | 3.0000E+01 |
| A4= | 2.0650E−01 | 3.6892E−01 | 3.4847E−02 | −5.0346E−01 | −5.5771E−01 |
| A6= | −6.0262E−02 | −8.5110E−02 | −3.1956E−01 | 1.2467E−01 | 6.0971E−02 |
| A8= | 5.0554E−02 | 1.2958E−02 | 9.3965E−01 | 2.4663E−02 | −9.5976E−02 |
| A10= | −2.0906E−02 | 7.5034E−01 | −2.5905E+00 | 2.8547E−03 | 3.8723E−01 |
| A12= | 4.8691E−02 | −5.4383E−02 | 3.7777E−02 | −8.3793E−02 | 8.8045E−02 |
| A14= | −5.6987E−03 | 6.3247E−05 | −8.4197E−03 | −4.0316E−03 | −4.1894E−03 |

| Surface # | 7 | 8 | 9 | 10 | 11 |
|---|---|---|---|---|---|
| k= | 3.0000E+01 | 1.3541E+01 | −2.7442E+00 | −1.1289E+00 | −3.3277E+00 |
| A4= | −7.4274E−02 | 6.3077E−02 | −1.7194E−01 | −1.9918E−01 | −9.2273E−02 |
| A6= | −1.8597E−02 | 6.6368E−02 | 5.8288E−02 | 4.3709E−02 | 2.6556E−02 |
| A8= | 6.0064E−02 | −1.1087E−01 | −2.8382E−02 | −1.1233E−02 | −6.2148E−03 |
| A10= | −7.1030E−02 | −1.2623E−01 | 5.0202E−03 | 1.0411E−03 | 8.4943E−04 |
| A12= | 7.5580E−03 | 2.6730E−01 | 3.0399E−03 | 2.6616E−05 | −6.2500E−05 |
| A14= | 1.4973E−02 | −1.4195E−01 | −4.8684E−03 | −4.3396E−06 | 1.3911E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| Embodiment 6 | | | |
|---|---|---|---|
| Fno | 2.4 | f2/f | 1.56 |
| FOV | 105.8 | R3/f | 2.03 |
| V1/V5 | 2.43 | CT4/CT5 | 2.16 |
| T12/CT1 | 1.52 | f5/f1 | 0.15 |
| \| f/f3 \| + \| f/f2 \| | 0.87 | T12*10/f | 2.12 |
| CA11/CA52 | 0.47 | \| f/f3 \| | 0.23 |
| (CT2 + CT4)/(CT1 + CT3) | 3.25 | | |

Figure 7A:
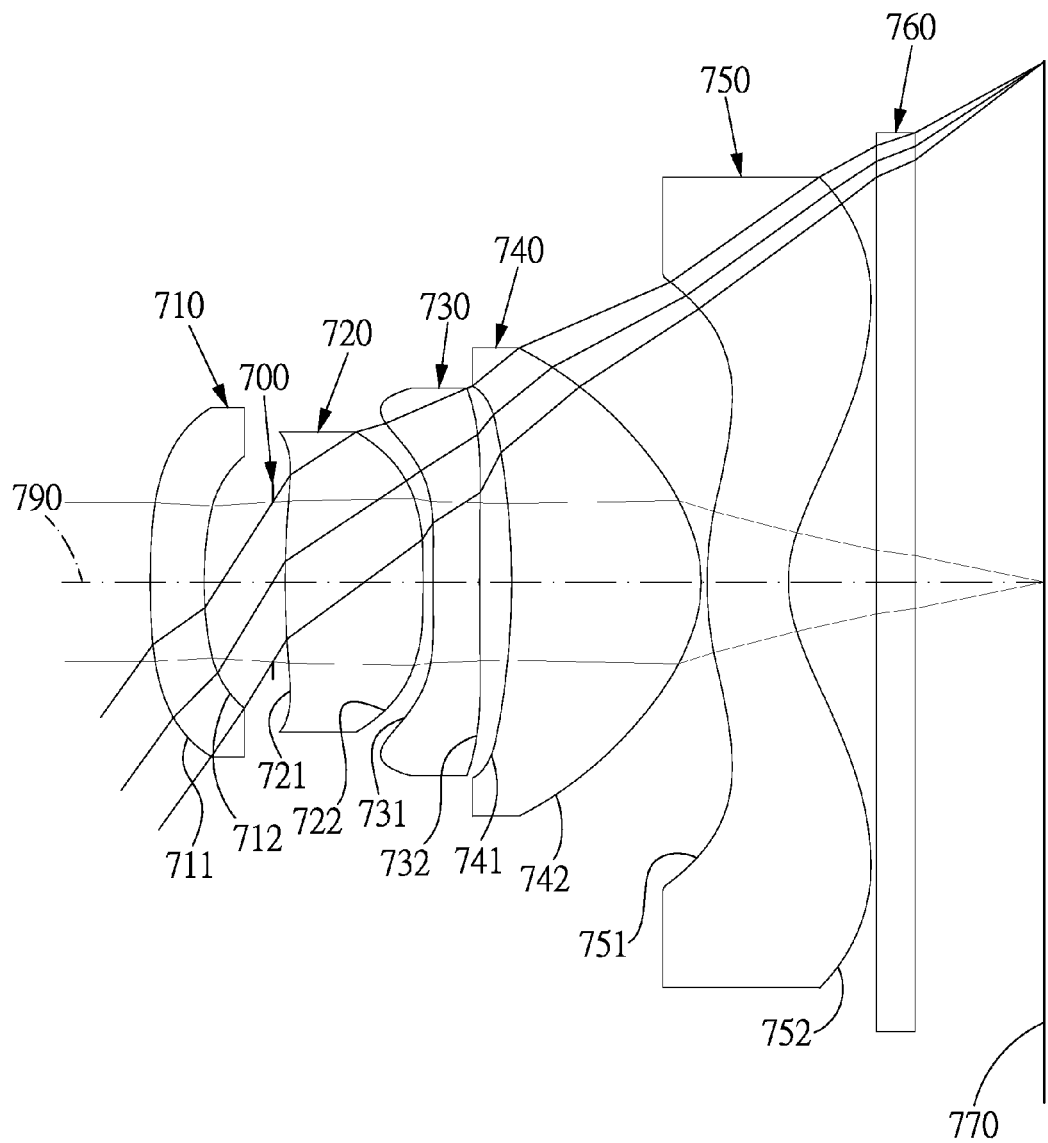
FIG. 7A shows a wide-angle image taking lens system in accordance with a seventh embodiment of the present invention.
Figure 7B:
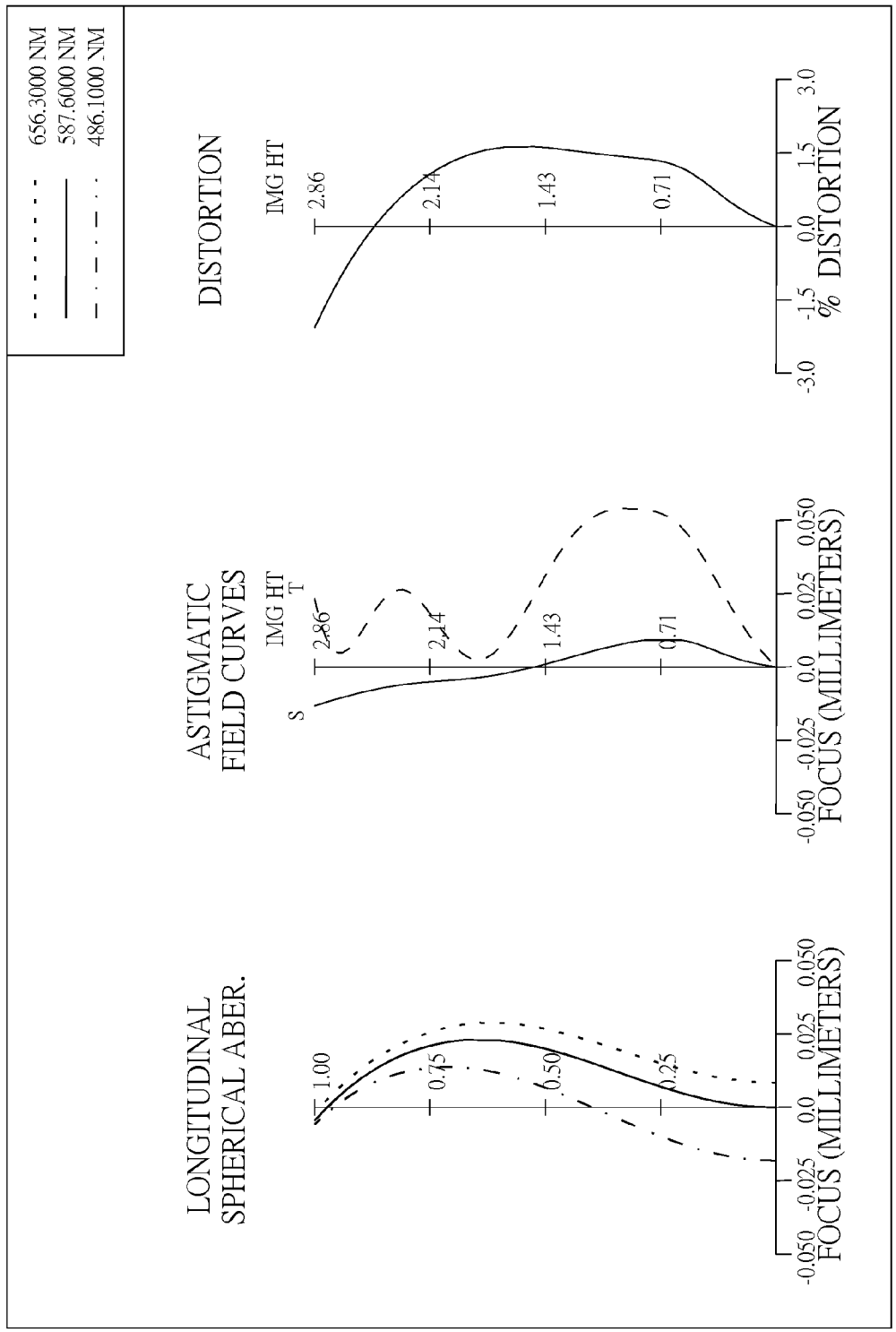
FIG. 7B shows the longitudinal spherical aberration curve, the astigmatic field curve and the distortion curve of the seventh embodiment of the present invention.

FIG. 7A shows a wide-angle image taking lens system in accordance with a seventh embodiment of the present invention, and FIG. 7B shows, in order from left to right, the longitudinal spherical aberration curves, the astigmatic field curves, and the distortion curve of the seventh embodiment of the present invention. A wide-angle image taking lens system in accordance with the seventh embodiment of the present invention comprises an aperture stop 700 and an optical assembly. The optical assembly comprises, in order from an object side to an image side: a first lens element 710, a second lens element 720, a third lens element 730, a fourth lens element 740, a fifth lens element 750, an IR cut filter 760 and an image plane 770, wherein the wide-angle image taking lens system has a total of five lens elements with refractive power. The aperture stop 700 is located between an image-side surface 712 of the first lens element 710 and an image-side surface 722 of the second lens element 720.

The first lens element 710 with a negative refractive power has an object-side surface 711 being convex near an optical axis 790 and the image-side surface 712 being concave near the optical axis 790, both the object-side and image-side surfaces 711, 712 are aspheric, and the first lens element 710 is made of plastic material.

The second lens element 720 with a positive refractive power has an object-side surface 721 being convex near the optical axis 790 and the image-side surface 722 being convex near the optical axis 790, both the object-side and image-side surfaces 721, 722 are aspheric, and the second lens element 720 is made of plastic material.

The third lens element 730 with a positive refractive power has an object-side surface 731 being convex near the optical axis 790 and an image-side surface 732 being concave near the optical axis 790, both the object-side and image-side surfaces 731, 732 are aspheric, and the third lens element 730 is made of plastic material.

The fourth lens element 740 with a positive refractive power has an object-side surface 741 being concave near the optical axis 790 and an image-side surface 742 being convex near the optical axis 790, both the object-side and image-side surfaces 741, 742 are aspheric, and the fourth lens element 740 is made of plastic material.

The fifth lens element 750 with a negative refractive power has an object-side surface 751 being convex near the optical axis 790 and an image-side surface 752 being concave near the optical axis 790, both the object-side and image-side surfaces 751, 752 are aspheric, the fifth lens element 750 is made of plastic material, and more than one inflection point is formed on the object-side surface 751 and the image-side surface 752 of the fifth lens element 750.

The IR cut filter 760 made of glass is located between the fifth lens element 750 and the image plane 770 and has no influence on the focal length of the wide-angle image taking lens system.

The detailed optical data of the seventh embodiment is shown in Table 13 and the aspheric surface data is shown in Table 14 below.

TABLE 13

(Embodiment 7)
f(focal length) = 2.06 mm, Fno = 2.4, HFOV = 54.23 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 5.2707(ASP) | 0.29 | Plastic | 1.544 | 56.5 | −10.40 |
| 2 | | 2.6757(ASP) | 0.37 | | | | |
| 3 | Aperture stop | Plane | 0.07 | | | | |
| 4 | Lens 2 | 4.5200(ASP) | 0.75 | Plastic | 1.515 | 57.0 | 5.23 |
| 5 | | −6.2701(ASP) | 0.05 | | | | |
| 6 | Lens 3 | 7.0073(ASP) | 0.25 | Plastic | 1.632 | 23.0 | 20.16 |
| 7 | | 15.3487(ASP) | 0.18 | | | | |
| 8 | Lens 4 | −3.5694(ASP) | 1.03 | Plastic | 1.544 | 56.5 | 1.50 |
| 9 | | −0.7300(ASP) | 0.03 | | | | |
| 10 | Lens 5 | 1.6247(ASP) | 0.44 | Plastic | 1.632 | 23.0 | −2.28 |
| 11 | | 0.6828(ASP) | 0.48 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 14

Aspheric Coefficients

| Surface # | 1 | 2 | 4 | 5 | 6 |
|---|---|---|---|---|---|
| k= | 2.6773E+01 | 4.3202E+00 | −1.3068E+01 | 3.0000E+01 | −3.0000E+01 |
| A4= | 2.7610E−01 | 5.1701E−01 | 1.4225E−02 | −8.3353E−01 | −7.0053E−01 |
| A6= | −1.5261E−01 | −4.5839E−01 | −1.5180E−01 | 2.7154E−01 | −1.1456E−02 |
| A8= | 1.2659E−01 | 8.6106E−01 | −1.3669E−01 | 2.4168E−01 | −3.3526E−02 |
| A10= | −1.4026E−02 | 7.3130E−01 | −2.8433E−01 | −4.8354E−01 | 3.6172E−01 |
| A12= | 4.8691E−02 | −5.4383E−02 | 3.7777E−02 | −8.3793E−02 | 8.8045E−02 |
| A14= | −5.6987E−03 | 6.3247E−05 | −8.4197E−03 | −4.0316E−03 | −4.1894E−03 |

| Surface # | 7 | 8 | 9 | 10 | 11 |
|---|---|---|---|---|---|
| k= | 1.9739E+01 | 1.0006E+01 | −2.8067E+00 | −1.1289E+00 | −3.3277E+00 |
| A4= | −3.3739E−02 | 1.2253E−02 | −2.0022E−01 | −1.9918E−01 | −9.2273E−02 |
| A6= | −8.8719E−02 | 2.4642E−01 | 8.3505E−02 | 4.3709E−02 | 2.6556E−02 |
| A8= | 6.8602E−02 | −1.8601E−01 | −4.5008E−02 | −1.1233E−02 | −6.2148E−03 |
| A10= | −3.5839E−02 | −2.1682E−01 | 9.7107E−03 | 1.0411E−03 | 8.4943E−04 |
| A12= | 3.5326E−03 | 3.4664E−01 | 1.0935E−02 | 2.6616E−05 | −6.2500E−05 |
| A14= | 3.1830E−03 | −1.4195E−01 | −7.0892E−03 | −4.3396E−06 | 1.3911E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| Embodiment 7 | | | |
|---|---|---|---|
| Fno | 2.4 | f2/f | 2.54 |
| FOV | 108.5 | R3/f | 2.19 |
| V1/V5 | 2.43 | CT4/CT5 | 2.33 |
| T12/CT1 | 1.50 | f5/f1 | 0.22 |
| | f/f3 | + | f/f2 | | 0.50 | T12*10/f | 2.13 |
| CA11/CA52 | 0.43 | | f/f3 | | 0.10 |
| (CT2 + CT4)/(CT1 + CT3) | 3.27 | | |

Figure 8A:
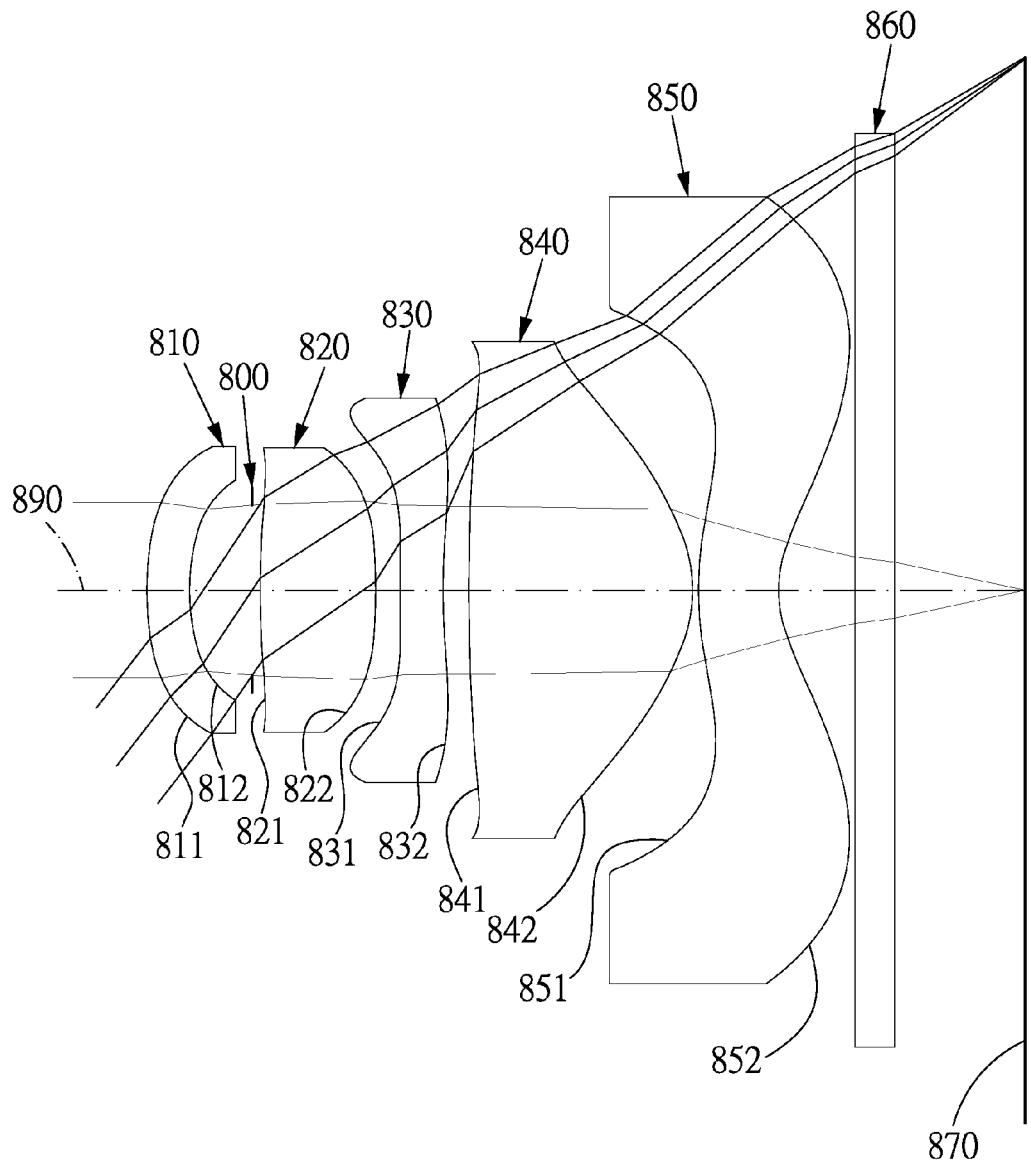
FIG. 8A shows a wide-angle image taking lens system in accordance with an eighth embodiment of the present invention.
Figure 8B:
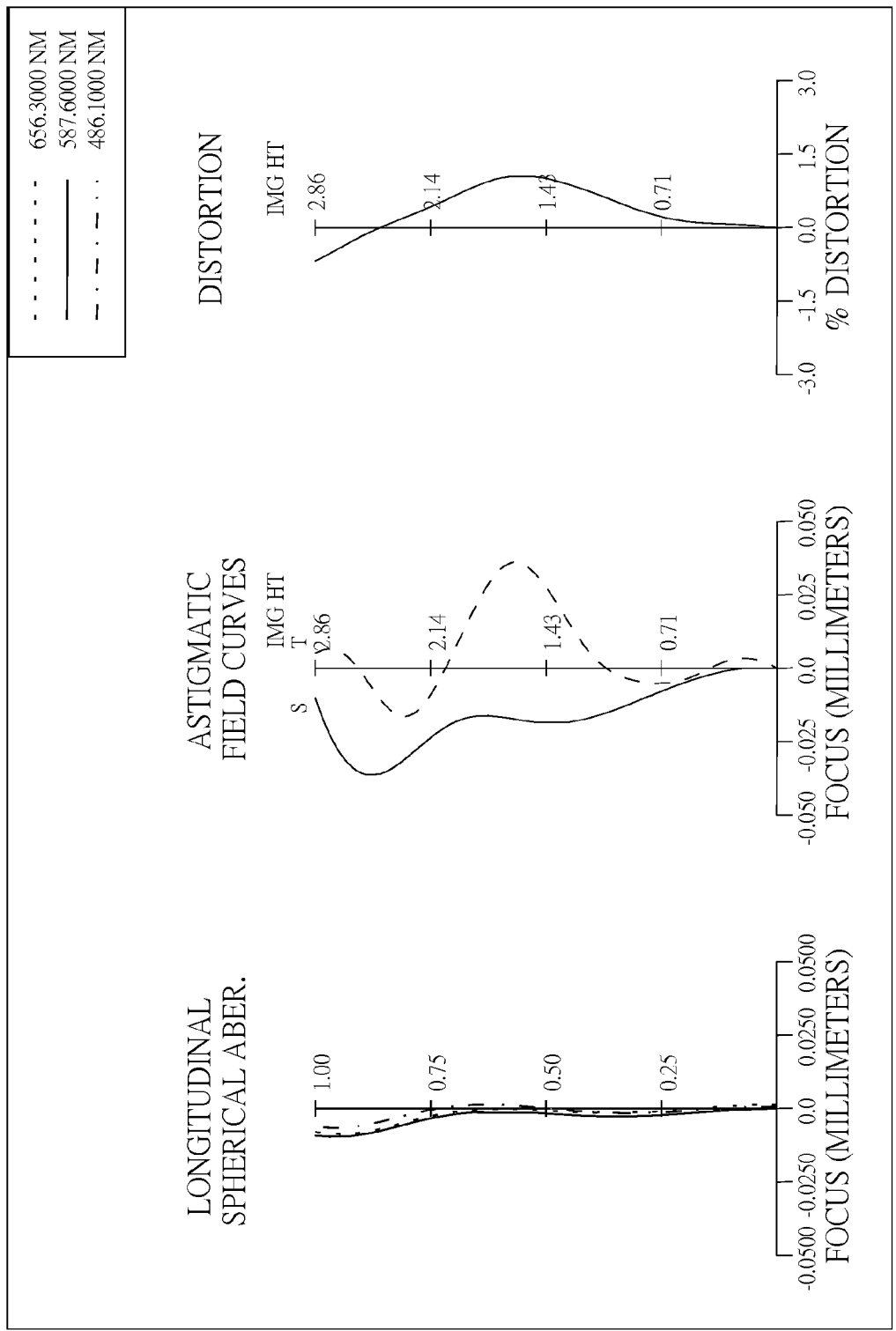
FIG. 8B shows the longitudinal spherical aberration curve, the astigmatic field curve and the distortion curve of the eighth embodiment of the present invention.

FIG. 8A shows a wide-angle image taking lens system in accordance with a eighth embodiment of the present invention, and FIG. 8B shows, in order from left to right, the longitudinal spherical aberration curves, the astigmatic field curves, and the distortion curve of the eighth embodiment of the present invention. A wide-angle image taking lens system in accordance with the eighth embodiment of the present invention comprises an aperture stop 800 and an optical assembly. The optical assembly comprises, in order from an object side to an image side: a first lens element 810, a second lens element 820, a third lens element 830, a fourth lens element 840, a fifth lens element 850, an IR cut filter 860 and an image plane 870, wherein the wide-angle image taking lens system has a total of five lens elements with refractive power. The aperture stop 800 is located between an image-side surface 812 of the first lens element 810 and an image-side surface 822 of the second lens element 820.

The first lens element 810 with a negative refractive power has an object-side surface 811 being convex near an optical axis 890 and the image-side surface 812 being concave near the optical axis 890, both the object-side and image-side surfaces 811, 812 are aspheric, and the first lens element 810 is made of plastic material.

The second lens element 820 with a positive refractive power has an object-side surface 821 being convex near the optical axis 890 and the image-side surface 822 being convex near the optical axis 890, both the object-side and image-side surfaces 821, 822 are aspheric, and the second lens element 820 is made of plastic material.

The third lens element 830 with a negative refractive power has an object-side surface 831 being convex near the optical axis 890 and an image-side surface 832 being concave near the optical axis 890, both the object-side and image-side surfaces 831, 832 are aspheric, and the third lens element 830 is made of plastic material.

The fourth lens element 840 with a positive refractive power has an object-side surface 841 being convex near the optical axis 890 and an image-side surface 842 being convex near the optical axis 890, both the object-side and image-side surfaces 841, 842 are aspheric, and the fourth lens element 840 is made of plastic material.

The fifth lens element 850 with a negative refractive power has an object-side surface 851 being convex near the optical axis 890 and an image-side surface 852 being concave near the optical axis 890, both the object-side and image-side surfaces 851, 852 are aspheric, the fifth lens element 850 is made of plastic material, and more than one inflection point is formed on the object-side surface 851 and the image-side surface 852 of the fifth lens element 850.

The IR cut filter 860 made of glass is located between the fifth lens element 850 and the image plane 870 and has no influence on the focal length of the wide-angle image taking lens system.

The detailed optical data of the eighth embodiment is shown in Table 15 and the aspheric surface data is shown in Table 16 below.

TABLE 15

(Embodiment 8)
f(focal length) = 2.24 mm, Fno = 2.4, HFOV = 51.9 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.8377(ASP) | 0.23 | Plastic | 1.515 | 57.0 | −11.59 |
| 2 | | 1.3450(ASP) | 0.34 | | | | |
| 3 | Aperture stop | Plane | 0.04 | | | | |
| 4 | Lens 2 | 4.6538(ASP) | 0.62 | Plastic | 1.515 | 57.0 | 3.90 |
| 5 | | −3.3680(ASP) | 0.13 | | | | |
| 6 | Lens 3 | 7.9251(ASP) | 0.23 | Plastic | 1.632 | 23.0 | −6.76 |
| 7 | | 2.7445(ASP) | 0.14 | | | | |
| 8 | Lens 4 | 15.0000(ASP) | 1.20 | Plastic | 1.544 | 56.5 | 1.27 |
| 9 | | −0.7035(ASP) | 0.03 | | | | |
| 10 | Lens 5 | 1.6046(ASP) | 0.43 | Plastic | 1.632 | 23.0 | −1.66 |
| 11 | | 0.5689(ASP) | 0.41 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 16

Aspheric Coefficients

| Surface # | 1 | 2 | 4 | 5 | 6 |
|---|---|---|---|---|---|
| k= | −3.1172E+00 | 2.3128E+00 | 4.1555E+00 | 1.2567E+01 | −3.0000E+01 |
| A4= | 4.1427E−01 | 4.2619E−01 | −3.3190E−02 | −3.5839E−01 | −5.9729E−01 |
| A6= | −2.0107E−01 | 5.0680E−01 | −1.0939E−01 | −2.1591E−01 | 1.0330E−01 |
| A8= | 1.3946E+00 | −2.2617E+00 | −1.9448E−01 | −9.4810E−02 | −1.4988E−01 |
| A10= | −2.7129E+00 | 1.0093E+01 | −1.9872E−03 | 2.7002E−01 | −3.0700E−02 |
| A12= | 3.1701E+00 | −2.5367E−01 | 1.7669E−01 | −3.6239E−01 | 4.1266E−01 |
| A14= | −3.6504E−02 | 3.9616E−04 | −5.1647E−02 | −2.4597E−02 | −2.5890E−02 |

| Surface # | 7 | 8 | 9 | 10 | 11 |
|---|---|---|---|---|---|
| k= | −3.0000E+01 | 3.0000E+01 | −3.6774E+00 | −5.4529E+00 | −3.8215E+00 |
| A4= | −2.3819E−01 | 3.7204E−02 | −2.1441E−01 | −2.0443E−01 | −1.2284E−01 |
| A6= | 1.1489E−01 | −6.3315E−02 | 1.7598E−01 | 6.8815E−02 | 4.6913E−02 |
| A8= | 3.3383E−02 | 1.0018E−01 | −9.8957E−02 | −3.2376E−02 | −1.5818E−02 |
| A10= | −7.6904E−02 | −1.0751E−01 | 2.7301E−02 | 2.7952E−03 | 3.0400E−03 |
| A12= | 1.2892E−02 | 6.1117E−02 | 6.3911E−03 | 1.2383E−04 | −2.9077E−04 |
| A14= | 1.0414E−02 | −1.4889E−02 | −2.8758E−03 | −2.6701E−05 | 8.5589E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| Embodiment 8 | | | |
|---|---|---|---|
| Fno | 2.4 | f2/f | 1.74 |
| FOV | 103.8 | R3/f | 2.08 |
| V1/V5 | 2.48 | CT4/CT5 | 2.80 |
| T12/CT1 | 1.64 | f5/f1 | 0.14 |
| \|f/f3\| + \|f/f2\| | 0.91 | T12*10/f | 1.69 |
| CA11/CA52 | 0.36 | \|f/f3\| | 0.33 |
| (CT2 + CT4)/(CT1 + CT3) | 3.95 | | |

Figure 9A:
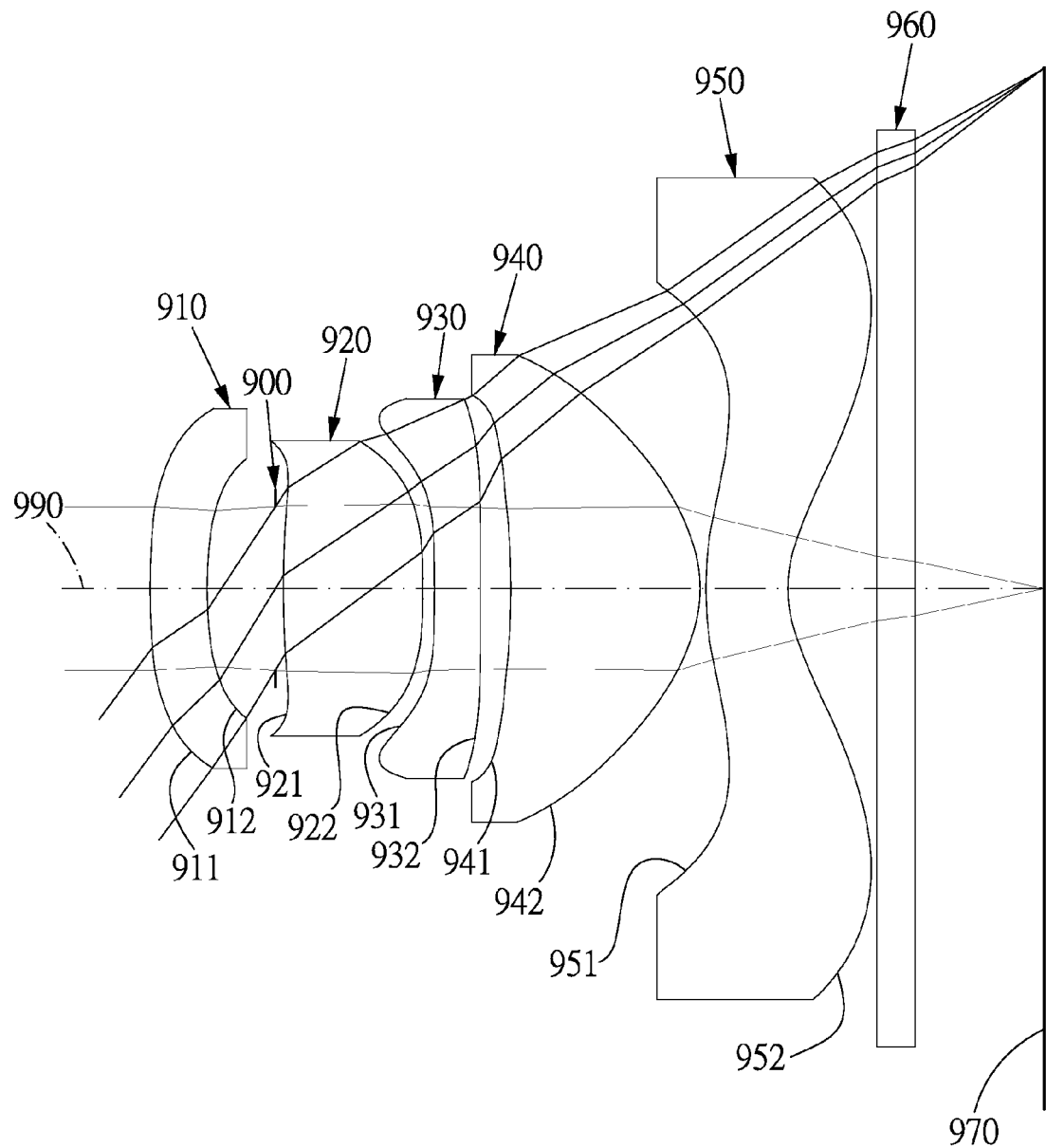
FIG. 9A shows a wide-angle image taking lens system in accordance with a ninth embodiment of the present invention.
Figure 9B:
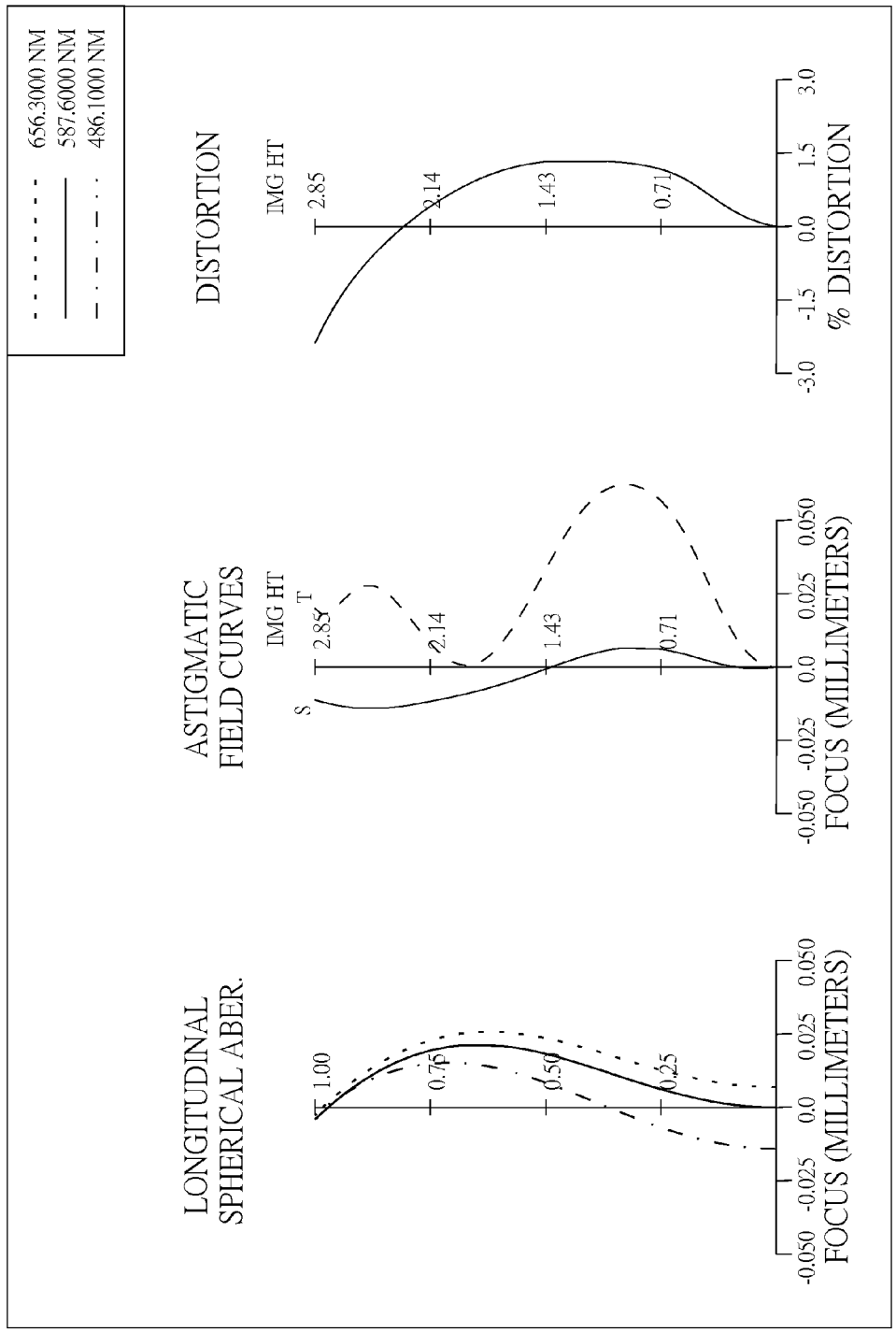
FIG. 9B shows the longitudinal spherical aberration curve, the astigmatic field curve and the distortion curve of the ninth embodiment of the present invention.

FIG. 9A shows a wide-angle image taking lens system in accordance with a ninth embodiment of the present invention, and FIG. 9B shows, in order from left to right, the longitudinal spherical aberration curves, the astigmatic field curves, and the distortion curve of the ninth embodiment of the present invention. A wide-angle image taking lens system in accordance with the ninth embodiment of the present invention comprises an aperture stop 900 and an optical assembly. The optical assembly comprises, in order from an object side to an image side: a first lens element 910, a second lens element 920, a third lens element 930, a fourth lens element 940, a fifth lens element 950, an IR cut filter 960 and an image plane 970, wherein the wide-angle image taking lens system has a total of five lens elements with refractive power. The aperture stop 900 is located between an image-side surface 912 of the first lens element 910 and an image-side surface 922 of the second lens element 920.

The first lens element 910 with a negative refractive power has an object-side surface 911 being convex near an optical axis 990 and the image-side surface 912 being concave near the optical axis 990, both the object-side and image-side surfaces 911, 912 are aspheric, and the first lens element 910 is made of plastic material.

The second lens element 920 with a positive refractive power has an object-side surface 921 being convex near the optical axis 990 and the image-side surface 922 being convex near the optical axis 990, both the object-side and image-side surfaces 921, 922 are aspheric, and the second lens element 920 is made of plastic material.

The third lens element 930 with a positive refractive power has an object-side surface 931 being convex near the optical axis 990 and an image-side surface 932 being convex near the optical axis 990, both the object-side and image-side surfaces 931, 932 are aspheric, and the third lens element 930 is made of plastic material.

The fourth lens element 940 with a positive refractive power has an object-side surface 941 being concave near the optical axis 990 and an image-side surface 942 being convex near the optical axis 990, both the object-side and image-side surfaces 941, 942 are aspheric, and the fourth lens element 940 is made of plastic material.

The fifth lens element 950 with a negative refractive power has an object-side surface 951 being convex near the optical axis 990 and an image-side surface 952 being concave near the optical axis 990, both the object-side and image-side surfaces 951, 952 are aspheric, the fifth lens element 950 is made of plastic material, and more than one inflection point is formed on the object-side surface 951 and the image-side surface 952 of the fifth lens element 950.

The IR cut filter 960 made of glass is located between the fifth lens element 950 and the image plane 970 and has no influence on the focal length of the wide-angle image taking lens system.

The detailed optical data of the ninth embodiment is shown in Table 17 and the aspheric surface data is shown in Table 18 below.

TABLE 17

(Embodiment 9)
f(focal length) = 2.12 mm, Fno = 2.4, HFOV = 53.47 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 5.4017(ASP) | 0.31 | Plastic | 1.544 | 56.5 | −13.03 |
| 2 | | 3.0040(ASP) | 0.37 | | | | |
| 3 | Aperture stop | Plane | 0.04 | | | | |
| 4 | Lens 2 | 4.6211(ASP) | 0.76 | Plastic | 1.515 | 57.0 | 4.65 |
| 5 | | −4.6922(ASP) | 0.06 | | | | |
| 6 | Lens 3 | 502.6895(ASP) | 0.25 | Plastic | 1.632 | 23.0 | 100.78 |
| 7 | | −72.9557(ASP) | 0.16 | | | | |
| 8 | Lens 4 | −3.7869(ASP) | 1.03 | Plastic | 1.544 | 56.5 | 1.50 |
| 9 | | −0.7336(ASP) | 0.03 | | | | |
| 10 | Lens 5 | 1.6780(ASP) | 0.45 | Plastic | 1.632 | 23.0 | −2.19 |
| 11 | | 0.6807(ASP) | 0.48 | | | | |
| 12 | IR-filter | Plane | 0.21 | Glass | 1.517 | 64.2 | |
| 13 | | Plane | 0.70 | | | | |
| 14 | Image | Plane | | | | | |

TABLE 18

Aspheric Coefficients

| Surface # | 1 | 2 | 4 | 5 | 6 |
|---|---|---|---|---|---|
| k= | 2.7427E+01 | 5.1218E+00 | −2.9281E+01 | 2.9964E+01 | 3.0000E+01 |
| A4= | 2.3236E−01 | 4.5233E−01 | 3.4944E−02 | −6.9073E−01 | −6.4498E−01 |
| A6= | −9.9794E−02 | −3.3513E−01 | −2.1860E−01 | 1.5470E−01 | −1.5666E−02 |
| A8= | 8.3820E−02 | 6.2337E−01 | 3.0198E−01 | 1.3043E−01 | −9.4286E−02 |
| A10= | −1.9439E−02 | 5.7644E−01 | −1.3248E+00 | −1.7688E−01 | 3.9206E−01 |
| A12= | 4.9403E−02 | −5.4383E−02 | 3.7777E−02 | −1.2556E−01 | 1.0898E−01 |
| A14= | −4.8082E−03 | 6.3247E−05 | −8.4197E−03 | −4.0316E−03 | 2.8858E−02 |

| Surface # | 7 | 8 | 9 | 10 | 11 |
|---|---|---|---|---|---|
| k= | 3.0000E+01 | 1.1819E+01 | −2.7468E+00 | −1.1289E+00 | −3.3277E+00 |
| A4= | −2.6087E−02 | 5.0737E−02 | −1.7422E−01 | −1.9918E−01 | −9.2273E−02 |
| A6= | −6.2957E−02 | 1.5952E−01 | 5.9380E−02 | 4.3709E−02 | 2.6556E−02 |
| A8= | 5.2821E−02 | −1.4841E−01 | −3.0812E−02 | −1.1233E−02 | −6.2148E−03 |
| A10= | −5.0989E−02 | −1.7615E−01 | 1.1325E−02 | 1.0411E−03 | 8.4943E−04 |
| A12= | 7.9605E−03 | 3.0625E−01 | 7.0606E−03 | 2.6616E−05 | −6.2500E−05 |
| A14= | 1.4380E−02 | −1.4200E−01 | −7.7162E−03 | −4.3396E−06 | 1.3911E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| Embodiment 9 | | | |
|---|---|---|---|
| Fno | 2.4 | f2/f | 2.19 |
| FOV | 106.9 | R3/f | 2.18 |
| V1/V5 | 2.43 | CT4/CT5 | 2.29 |
| T12/CT1 | 1.34 | f5/f1 | 0.17 |
| \| f/f3 \| + \| f/f2 \| | 0.48 | T12*10/f | 1.95 |
| CA11/CA52 | 0.44 | \| f/f3 \| | 0.02 |
| (CT2 + CT4)/(CT1 + CT3) | 3.19 | | |

Figure 10A:
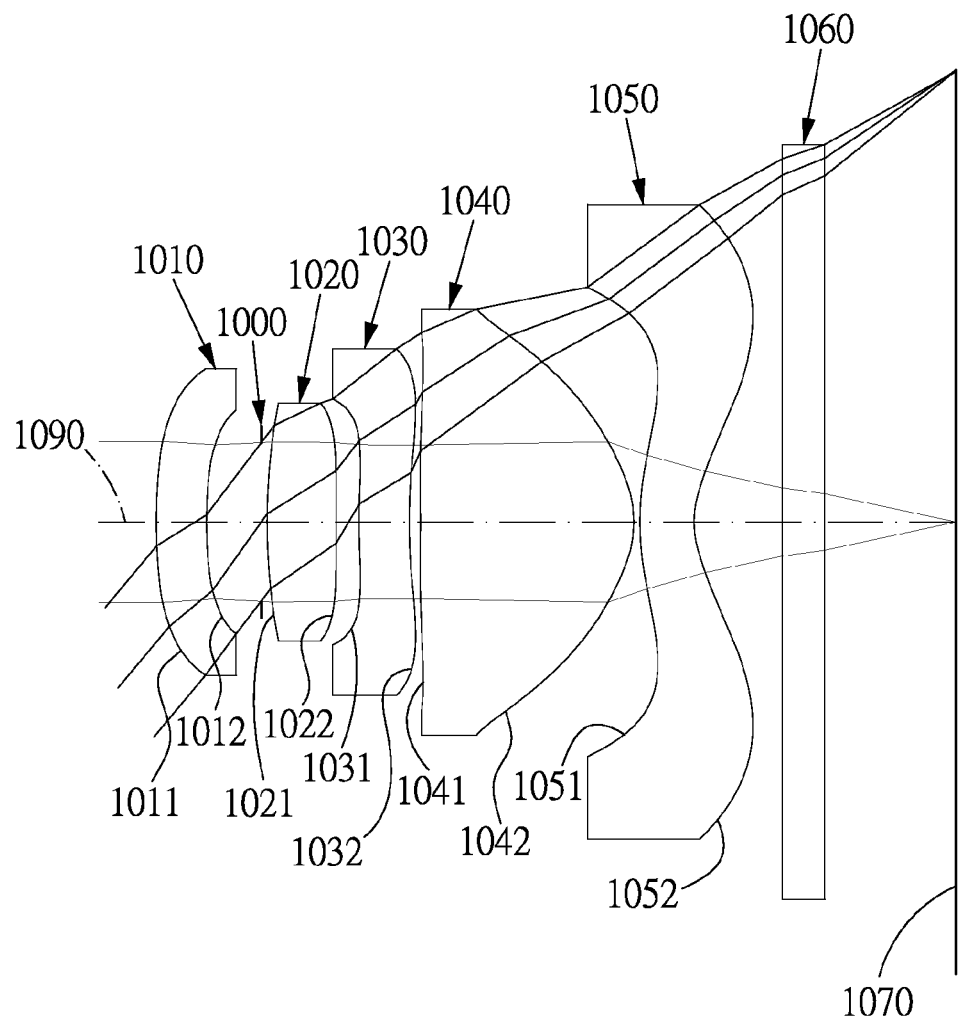
FIG. 10A shows a wide-angle image taking lens system in accordance with a tenth embodiment of the present invention.
Figure 10B:
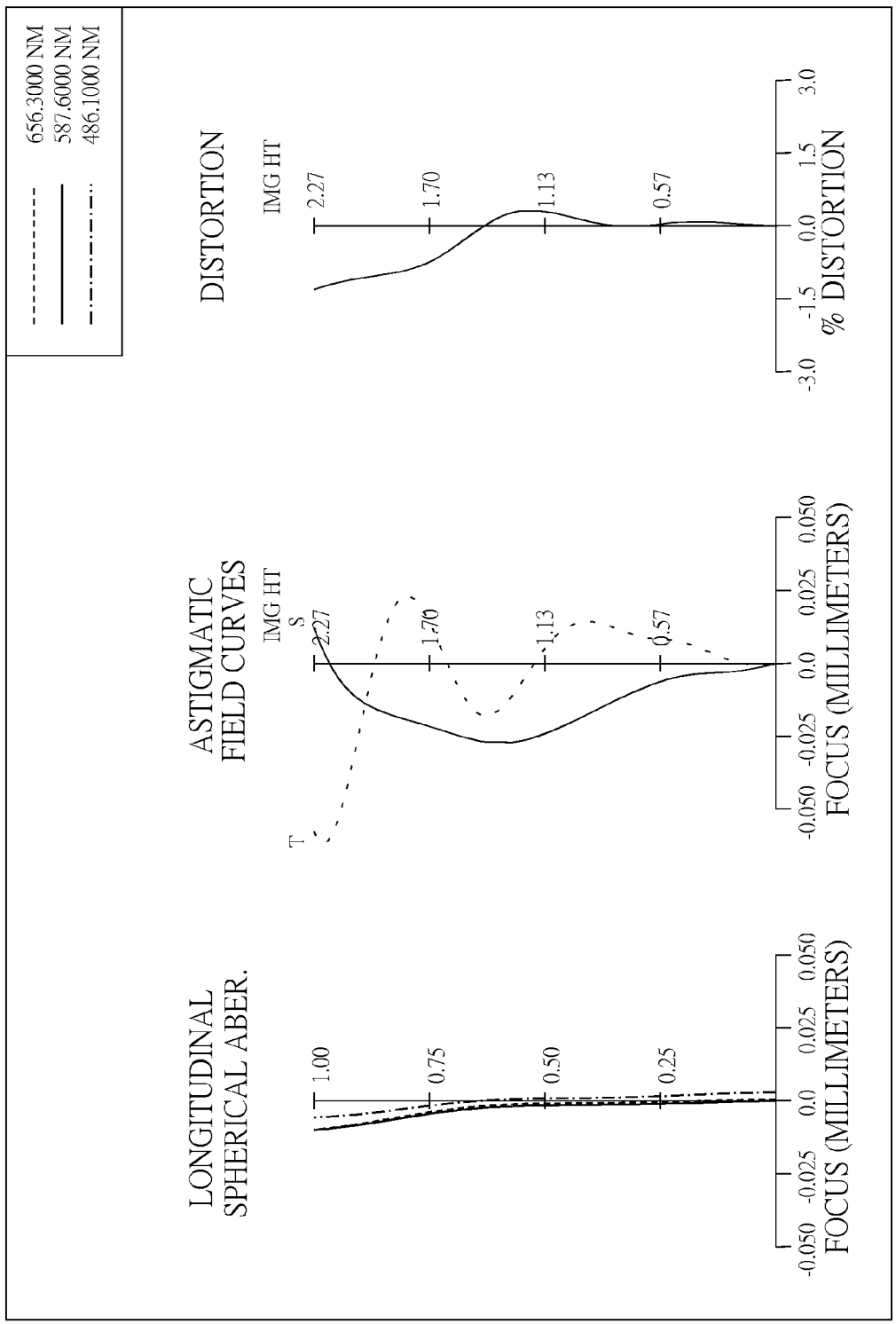
FIG. 10B shows the longitudinal spherical aberration curve, the astigmatic field curve and the distortion curve of the tenth embodiment of the present invention.

FIG. 10A shows a wide-angle image taking lens system in accordance with a tenth embodiment of the present invention, and FIG. 10B shows, in order from left to right, the longitudinal spherical aberration curves, the astigmatic field curves, and the distortion curve of the tenth embodiment of the present invention. A wide-angle image taking lens system in accordance with the tenth embodiment of the present invention comprises an aperture stop 1000 and an optical assembly. The optical assembly comprises, in order from an object side to an image side: a first lens element 1010, a second lens element 1020, a third lens element 1030, a fourth lens element 1040, a fifth lens element 1050, an IR cut filter 1060 and an image plane 1070, wherein the wide-angle image taking lens system has a total of five lens elements with refractive power. The aperture stop 1000 is located between an image-side surface 1012 of the first lens element 1010 and an image-side surface 1022 of the second lens element 1020.

The first lens element 1010 with a negative refractive power has an object-side surface 1011 being convex near an optical axis 1090 and the image-side surface 1012 being concave near the optical axis 1090, both the object-side and image-side surfaces 1011, 1012 are aspheric, and the first lens element 1010 is made of plastic material.

The second lens element 1020 with a positive refractive power has an object-side surface 1021 being convex near the optical axis 1090 and the image-side surface 1022 being concave near the optical axis 1090, both the object-side and image-side surfaces 1021, 1022 are aspheric, and the second lens element 1020 is made of plastic material.

The third lens element 1030 with a negative refractive power has an object-side surface 1031 being convex near the optical axis 1090 and an image-side surface 1032 being concave near the optical axis 1090, both the object-side and image-side surfaces 1031, 1032 are aspheric, and the third lens element 1030 is made of plastic material.

The fourth lens element 1040 with a positive refractive power has an object-side surface 1041 being concave near the optical axis 1090 and an image-side surface 1042 being convex near the optical axis 1090, both the object-side and image-side surfaces 1041, 1042 are aspheric, and the fourth lens element 1040 is made of plastic material.

The fifth lens element 1050 with a negative refractive power has an object-side surface 1051 being convex near the optical axis 1090 and an image-side surface 1052 being concave near the optical axis 1090, both the object-side and image-side surfaces 1051, 1052 are aspheric, the fifth lens element 1050 is made of plastic material, and more than one inflection point is formed on the object-side surface 1051 and the image-side surface 1052 of the fifth lens element 1050.

The IR cut filter 1060 made of glass is located between the fifth lens element 1050 and the image plane 1070 and has no influence on the focal length of the wide-angle image taking lens system.

The detailed optical data of the tenth embodiment is shown in Table 19 and the aspheric surface data is shown in Table 20 below.

TABLE 19

(Embodiment 10)
f(focal length) = 1.913 mm, Fno = 2.4, HFOV = 49.85 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 3.6858(ASP) | 0.25 | Plastic | 1.515 | 57.0 | −23.00 |
| 2 | | 2.7459(ASP) | 0.28 | | | | |
| 3 | Aperture stop | Plane | 0.03 | | | | |
| 4 | Lens 2 | 3.9712(ASP) | 0.35 | Plastic | 1.533 | 55.7 | 8.07 |
| 5 | | 50.0000(ASP) | 0.11 | | | | |
| 6 | Lens 3 | 3.4137(ASP) | 0.25 | Plastic | 1.642 | 22.0 | −17.62 |
| 7 | | 2.5472(ASP) | 0.06 | | | | |
| 8 | Lens 4 | −20.0000(ASP) | 1.07 | Plastic | 1.544 | 56.5 | 0.93 |
| 9 | | −0.5044(ASP) | 0.03 | | | | |
| 10 | Lens 5 | 1.2814(ASP) | 0.27 | Plastic | 1.650 | 21.4 | −1.27 |
| 11 | | 0.4594(ASP) | 0.44 | | | | |
| 12 | IR-filter | Plane | 0.21 | Glass | 1.517 | 64.2 | |
| 13 | | Plane | 0.66 | | | | |
| 14 | Image | Plane | | | | | |

TABLE 20

Aspheric Coefficients

| Surface # | 1 | 2 | 4 | 5 | 6 |
|---|---|---|---|---|---|
| k= | 2.1716E+01 | 2.2660E+01 | 6.5121E+00 | 9.9000E+01 | 2.7197E+01 |
| A4= | 3.3588E−01 | 5.9588E−01 | 1.1444E−01 | −5.0716E−01 | −9.7277E−01 |
| A6= | −6.4134E−02 | −3.6948E−01 | −1.7783E−01 | 5.5747E−01 | 6.4272E−01 |
| A8= | −2.5457E−01 | 8.3602E−01 | 8.6413E−01 | −1.8442E+00 | −5.5069E+00 |
| A10= | 9.0094E−01 | −1.4010E+01 | −2.2865E+00 | −4.7149E+00 | 2.6617E+00 |
| A12= | 4.4300E−01 | 1.2008E+02 | 1.2063E+00 | 2.4472E+00 | 3.5406E+01 |
| A14= | −1.3572E+00 | −2.3722E+02 | −5.2525E−01 | 1.2323E−01 | −1.2598E+02 |

| Surface # | 7 | 8 | 9 | 10 | 11 |
|---|---|---|---|---|---|
| k= | −1.3249E+00 | 3.0000E+01 | −3.7099E+00 | −6.2069E+00 | −4.3337E+00 |
| A4= | −2.7864E−01 | 2.6223E−01 | −4.7665E−01 | −2.4964E−01 | −1.4153E−01 |
| A6= | −1.4745E−01 | −5.1475E−01 | 4.5787E−01 | 8.6247E−02 | 7.4028E−03 |
| A8= | 3.6383E−01 | 5.4782E−01 | −3.9525E−01 | −1.5108E−01 | −8.9717E−04 |
| A10= | −2.5231E−01 | −3.6789E−01 | 1.5349E−02 | 4.6258E−02 | 2.5924E−03 |
| A12= | −5.3404E−01 | 5.3292E−02 | 1.0871E−01 | −8.0978E−03 | −9.4166E−04 |
| A14= | 2.9561E−01 | 4.3336E−02 | 1.0691E−02 | −2.7103E−04 | 8.6877E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| Embodiment 10 | | | |
|---|---|---|---|
| Fno | 2.4 | f2/f | 4.22 |
| FOV | 99.7 | R3/f | 2.08 |
| V1/V5 | 2.66 | CT4/CT5 | 3.93 |
| T12/CT1 | 1.22 | f5/fl | 0.06 |
| \| f/f3 \| + \| f/f2 \| | 0.35 | T12*10/f | 1.59 |
| CA11/CA52 | 0.48 | \| f/f3 \| | 0.11 |
| (CT2 + CT4)/(CT1 + CT3) | 2.83 | | |

Figure 11A:
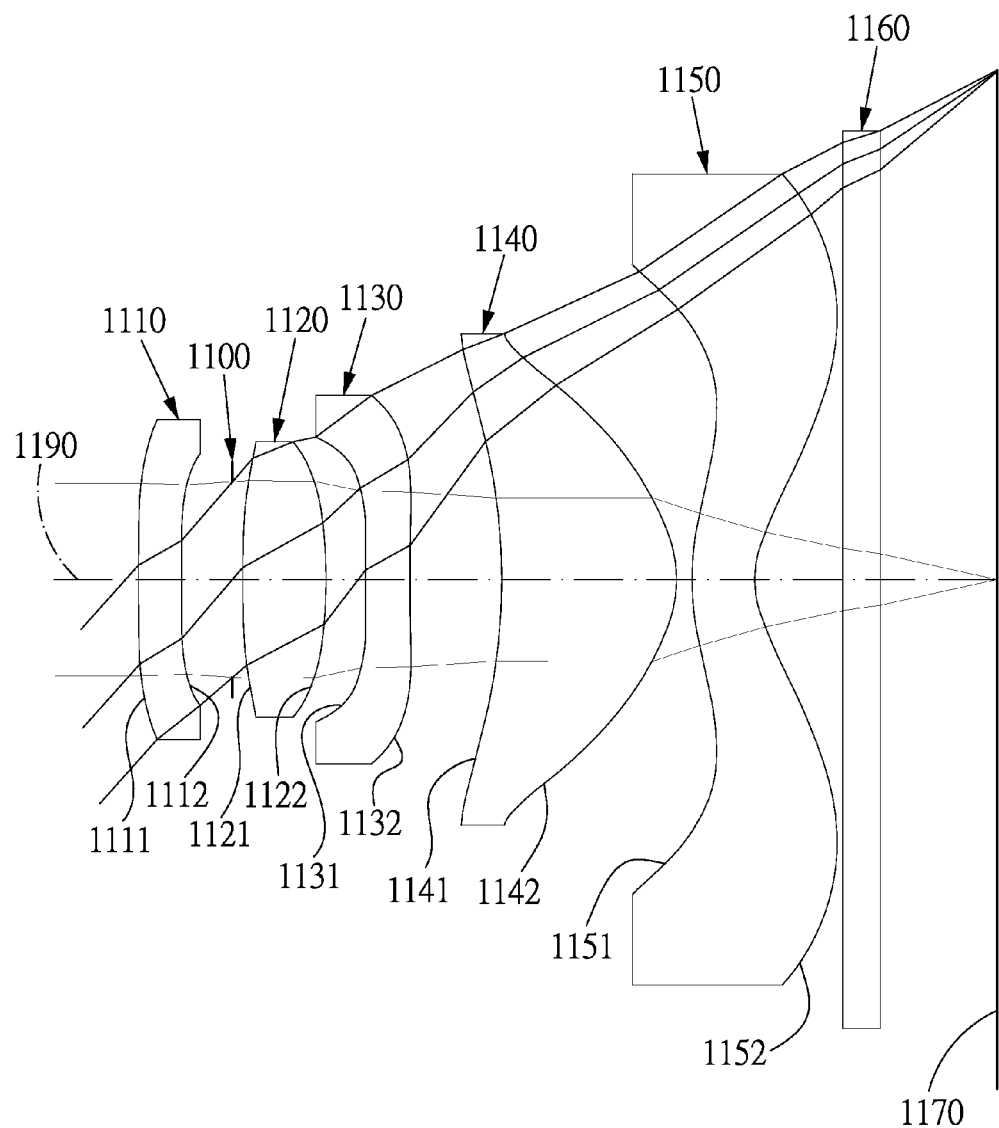
FIG. 11A shows a wide-angle image taking lens system in accordance with an eleventh embodiment of the present invention.
Figure 11B:
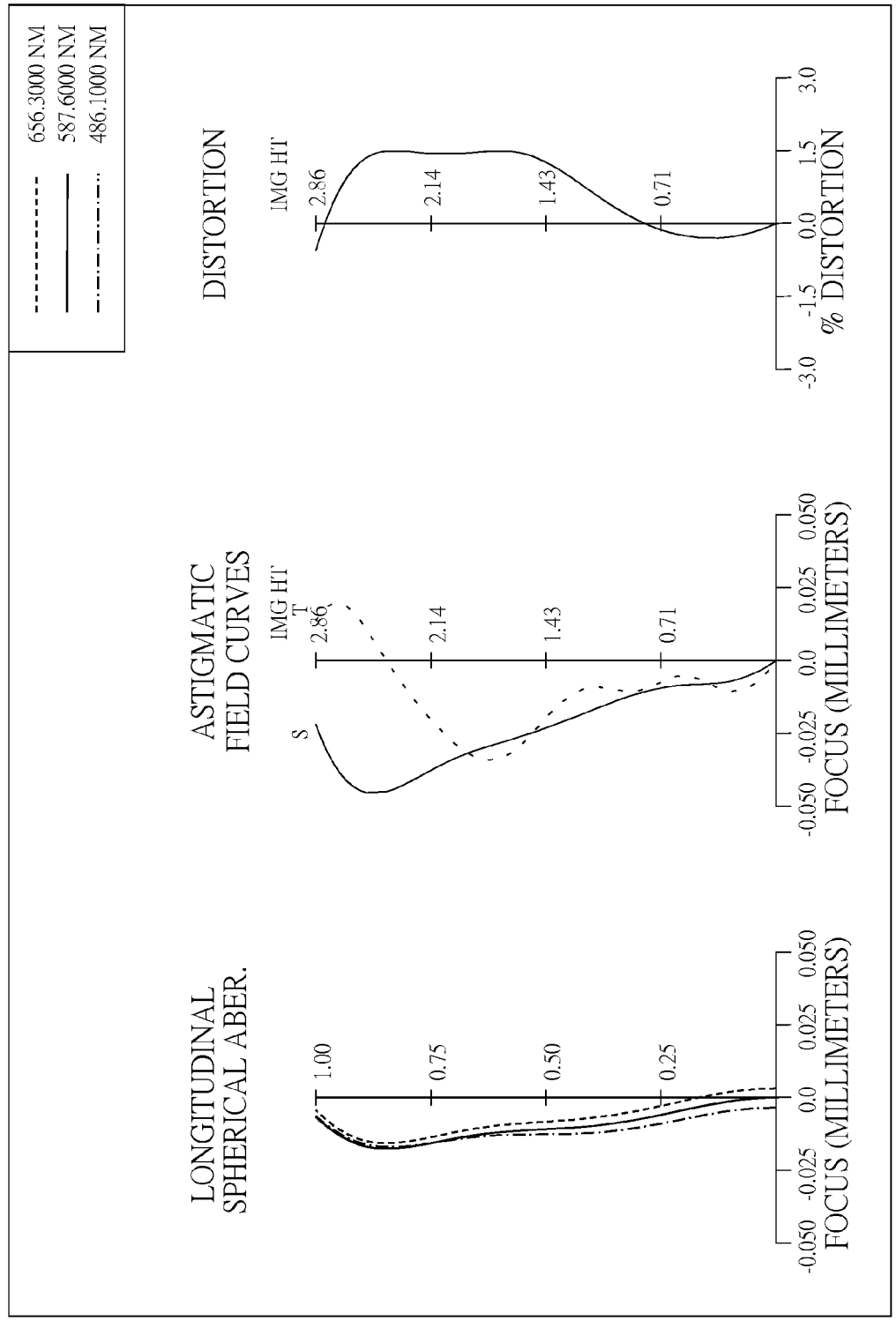
FIG. 11B shows the longitudinal spherical aberration curve, the astigmatic field curve and the distortion curve of the eleventh embodiment of the present invention.

FIG. 11A shows a wide-angle image taking lens system in accordance with a eleventh embodiment of the present invention, and FIG. 11B shows, in order from left to right, the longitudinal spherical aberration curves, the astigmatic field curves, and the distortion curve of the eleventh embodiment of the present invention. A wide-angle image taking lens system in accordance with the eleventh embodiment of the present invention comprises an aperture stop 1100 and an optical assembly. The optical assembly comprises, in order from an object side to an image side: a first lens element 1110, a second lens element 1120, a third lens element 1130, a fourth lens element 1140, a fifth lens element 1150, an IR cut filter 1160 and an image plane 1170, wherein the wide-angle image taking lens system has a total of five lens elements with refractive power. The aperture stop 1100 is located between an image-side surface 1112 of the first lens element 1110 and an image-side surface 1122 of the second lens element 1120.

The first lens element 1110 with a negative refractive power has an object-side surface 1111 being concave near an optical axis 1190 and the image-side surface 1112 being convex near the optical axis 1190, both the object-side and image-side surfaces 1111, 1112 are aspheric, and the first lens element 1110 is made of plastic material.

The second lens element 1120 with a positive refractive power has an object-side surface 1121 being convex near the optical axis 1190 and the image-side surface 1122 being convex near the optical axis 1190, both the object-side and image-side surfaces 1121, 1122 are aspheric, and the second lens element 1120 is made of plastic material.

The third lens element 1130 with a negative refractive power has an object-side surface 1131 being convex near the optical axis 1190 and an image-side surface 1132 being concave near the optical axis 1190, both the object-side and image-side surfaces 1131, 1132 are aspheric, and the third lens element 1130 is made of plastic material.

The fourth lens element 1140 with a positive refractive power has an object-side surface 1141 being concave near the optical axis 1190 and an image-side surface 1142 being convex near the optical axis 1190, both the object-side and image-side surfaces 1141, 1142 are aspheric, and the fourth lens element 1140 is made of plastic material.

The fifth lens element 1150 with a negative refractive power has an object-side surface 1151 being convex near the optical axis 1190 and an image-side surface 1152 being concave near the optical axis 1190, both the object-side and image-side surfaces 1151, 1152 are aspheric, the fifth lens element 1150 is made of plastic material, and more than one inflection point is formed on the object-side surface 1151 and the image-side surface 1152 of the fifth lens element 1150.

The IR cut filter 1160 made of glass is located between the fifth lens element 1150 and the image plane 1170 and has no influence on the focal length of the wide-angle image taking lens system.

The detailed optical data of the eleventh embodiment is shown in Table 21 and the aspheric surface data is shown in Table 22 below.

TABLE 21

(Embodiment 11)
f(focal length) = 2.574 mm, Fno = 2.4, HFOV = 47.97 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | −39.1130(ASP) | 0.24 | Plastic | 1.515 | 57.0 | −133.92 |
| 2 | | −90.6338(ASP) | 0.29 | | | | |
| 3 | Aperture stop | Plane | 0.06 | | | | |
| 4 | Lens 2 | 7.6644(ASP) | 0.47 | Plastic | 1.544 | 56.5 | 3.97 |
| 5 | | −2.9441(ASP) | 0.22 | | | | |
| 6 | Lens 3 | 90.0000(ASP) | 0.25 | Plastic | 1.650 | 21.4 | −12.55 |
| 7 | | 7.4734(ASP) | 0.52 | | | | |
| 8 | Lens 4 | −2.8942(ASP) | 0.98 | Plastic | 1.533 | 55.7 | 1.39 |
| 9 | | −0.6603(ASP) | 0.09 | | | | |
| 10 | Lens 5 | 1.3075(ASP) | 0.35 | Plastic | 1.650 | 21.4 | −1.62 |
| 11 | | 0.5204(ASP) | 0.49 | | | | |
| 12 | IR-filter | Plane | 0.21 | Glass | 1.517 | 64.2 | |
| 13 | | Plane | 0.66 | | | | |
| 14 | Image | Plane | | | | | |

TABLE 22

| Aspheric Coefficients | | | | | |
|---|---|---|---|---|---|
| Surface # | 1 | 2 | 4 | 5 | 6 |
| k= | −3.0000E+01 | −3.0000E+01 | 1.9155E+01 | 9.8770E+00 | 3.0000E+01 |
| A4= | 1.9602E−01 | 3.4799E−01 | 1.4461E−01 | −9.4086E−02 | −3.6684E−01 |
| A6= | 7.8300E−03 | 3.4838E−01 | −1.1356E−02 | 4.0237E−02 | −1.7854E−01 |
| A8= | −2.8394E−02 | −1.6356E+00 | −8.0696E−02 | −4.9369E−01 | −3.7855E−01 |
| A10= | 1.4522E−02 | 4.6066E+00 | −2.1433E−02 | 6.8065E−01 | 3.4675E−01 |
| A12= | 4.6566E−02 | −3.8750E+00 | 3.4058E−02 | −4.4441E−01 | −1.1763E+01 |
| A14= | −9.3140E−02 | 2.9983E−06 | −1.5099E−01 | −1.8908E−02 | −6.0640E+03 |
| Surface # | 7 | 8 | 9 | 10 | 11 |
| k= | 1.1630E+01 | −1.2558E+01 | −3.2140E+00 | −7.3851E+00 | −3.5392E+00 |
| A4= | −1.9138E−01 | −6.1365E−03 | −2.1063E−01 | −1.0423E−01 | −9.8826E−02 |
| A6= | −5.8797E−02 | −5.3044E−02 | 1.0762E−01 | 1.2302E−03 | 3.1797E−02 |
| A8= | 2.2700E−02 | 9.3245E−02 | −5.5792E−02 | 1.4307E−03 | −9.2401E−03 |
| A10= | −2.3552E−02 | −6.8834E−02 | 1.0492E−02 | −9.3975E−04 | 1.6972E−03 |
| A12= | −9.7815E−03 | 2.4682E−02 | 1.1311E−03 | 2.5690E−04 | −1.5242E−04 |
| A14= | 1.9228E−03 | −3.2343E−03 | 1.5622E−03 | 1.9527E−06 | 3.9383E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| Embodiment 11 | | | |
|---|---|---|---|
| Fno | 2.4 | f2/f | 1.54 |
| FOV | 95.9 | R3/f | 2.98 |
| V1/V5 | 2.66 | CT4/CT5 | 2.77 |
| T12/CT1 | 1.44 | f5/fl | 0.01 |
| \| f/f3 \| + \| f/f2 \| | 0.85 | T12*10/f | 1.34 |
| CA11/CA52 | 0.39 | \| f/f3 \| | 0.21 |
| (CT2 + CT4)/(CT1 + CT3) | 2.96 | | |

Figure 12A:
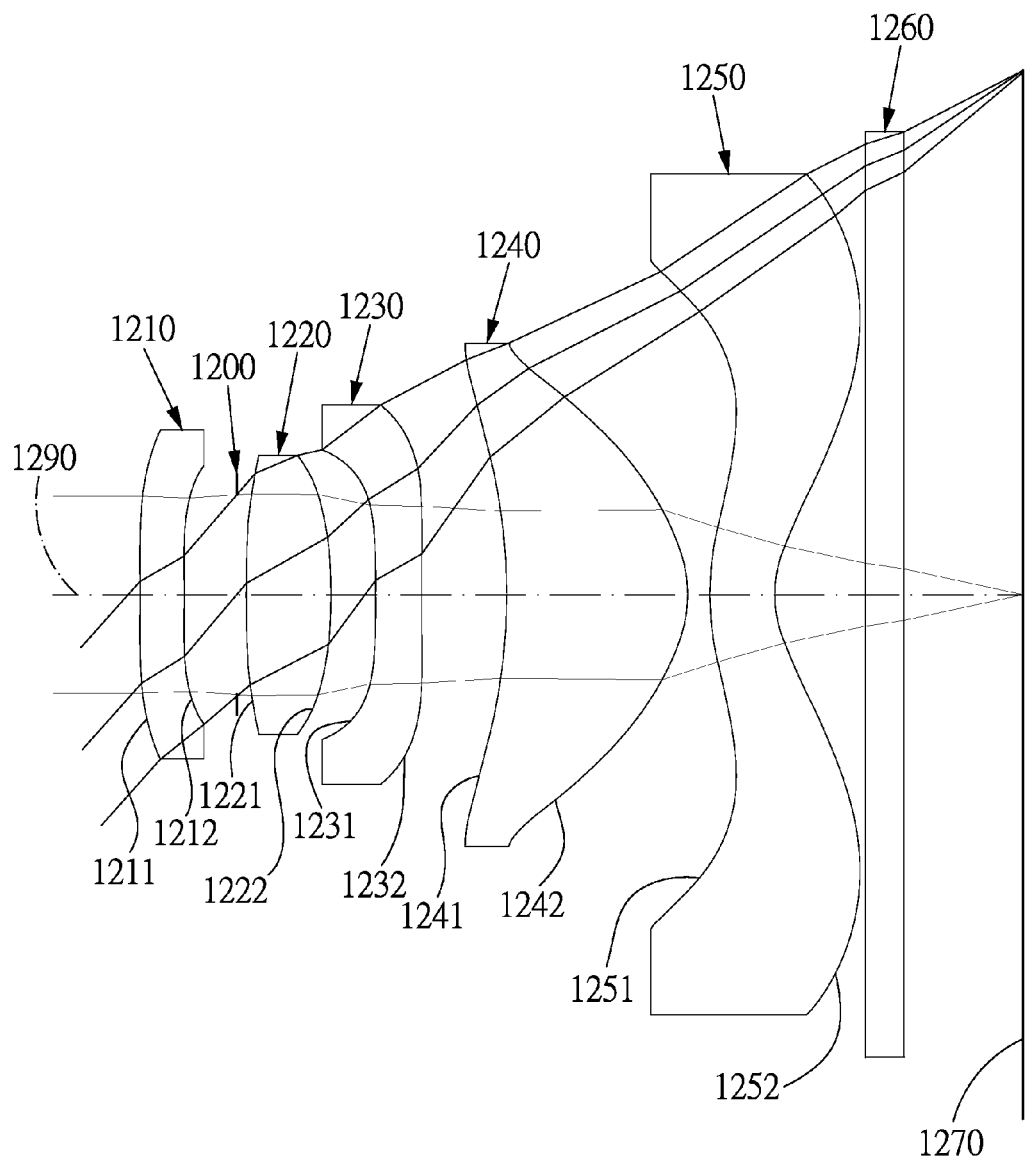
FIG. 12A shows a wide-angle image taking lens system in accordance with a twelfth embodiment of the present invention.
Figure 12B:
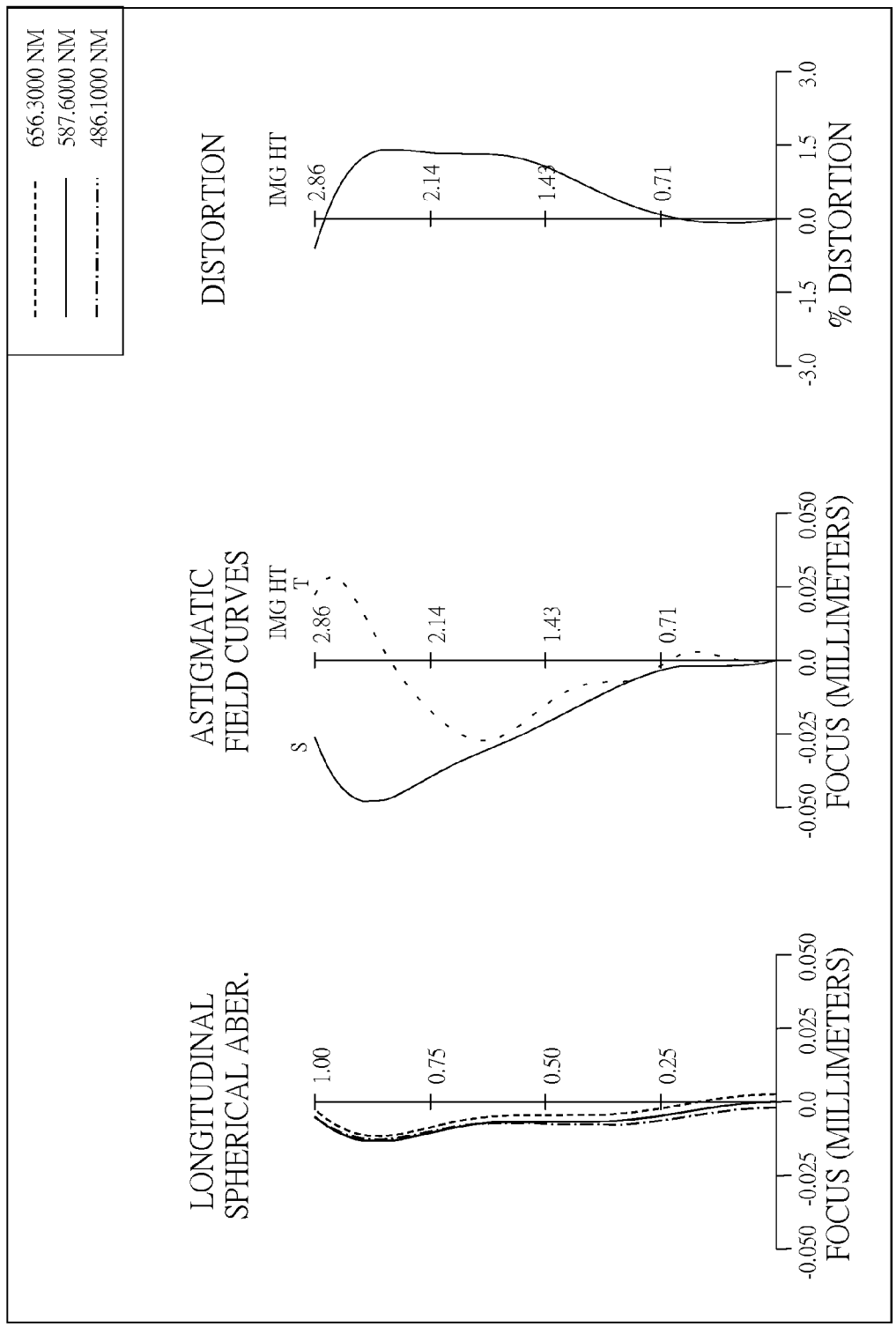
FIG. 12B shows the longitudinal spherical aberration curve, the astigmatic field curve and the distortion curve of the twelfth embodiment of the present invention.

FIG. 12A shows a wide-angle image taking lens system in accordance with a twelfth embodiment of the present invention, and FIG. 12B shows, in order from left to right, the longitudinal spherical aberration curves, the astigmatic field curves, and the distortion curve of the twelfth embodiment of the present invention. A wide-angle image taking lens system in accordance with the twelfth embodiment of the present invention comprises an aperture stop 1200 and an optical assembly. The optical assembly comprises, in order from an object side to an image side: a first lens element 1210, a second lens element 1220, a third lens element 1230, a fourth lens element 1240, a fifth lens element 1250, an IR cut filter 1260 and an image plane 1270, wherein the wide-angle image taking lens system has a total of five lens elements with refractive power. The aperture stop 1200 is located between an image-side surface 1212 of the first lens element 1210 and an image-side surface 1222 of the second lens element 1220.

The first lens element 1210 with a negative refractive power has an object-side surface 1211 being concave near an optical axis 1290 and the image-side surface 1212 being convex near the optical axis 1290, both the object-side and image-side surfaces 1211, 1212 are aspheric, and the first lens element 1210 is made of plastic material.

The second lens element 1220 with a positive refractive power has an object-side surface 1221 being convex near the optical axis 1290 and the image-side surface 1222 being convex near the optical axis 1290, both the object-side and image-side surfaces 1221, 1222 are aspheric, and the second lens element 1220 is made of plastic material.

The third lens element 1230 with a negative refractive power has an object-side surface 1231 being concave near the optical axis 1290 and an image-side surface 1232 being concave near the optical axis 1290, both the object-side and image-side surfaces 1231, 1232 are aspheric, and the third lens element 1230 is made of plastic material.

The fourth lens element 1240 with a positive refractive power has an object-side surface 1241 being concave near the optical axis 1290 and an image-side surface 1242 being convex near the optical axis 1290, both the object-side and image-side surfaces 1241, 1242 are aspheric, and the fourth lens element 1240 is made of plastic material.

The fifth lens element 1250 with a negative refractive power has an object-side surface 1251 being convex near the optical axis 1290 and an image-side surface 1252 being concave near the optical axis 1290, both the object-side and image-side surfaces 1251, 1252 are aspheric, the fifth lens element 1250 is made of plastic material, and more than one inflection point is formed on the object-side surface 1251 and the image-side surface 1252 of the fifth lens element 1250.

The IR cut filter 1260 made of glass is located between the fifth lens element 1250 and the image plane 1270 and has no influence on the focal length of the wide-angle image taking lens system.

The detailed optical data of the twelfth embodiment is shown in Table 23 and the aspheric surface data is shown in Table 24 below.

TABLE 23

(Embodiment 12)
f(focal length) = 2.555 mm, Fno = 2.4, HFOV = 48.18 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | −65.5134(ASP) | 0.24 | Plastic | 1.515 | 57.0 | −491.75 |
| 2 | | −88.5093(ASP) | 0.29 | | | | |
| 3 | Aperture stop | Plane | 0.05 | | | | |
| 4 | Lens 2 | 8.9984(ASP) | 0.46 | Plastic | 1.544 | 56.5 | 3.68 |
| 5 | | −2.5262(ASP) | 0.25 | | | | |
| 6 | Lens 3 | −9.6224(ASP) | 0.25 | Plastic | 1.650 | 21.4 | −8.94 |
| 7 | | 14.8291(ASP) | 0.46 | | | | |
| 8 | Lens 4 | −2.7750(ASP) | 0.99 | Plastic | 1.533 | 55.7 | 1.46 |
| 9 | | −0.6818(ASP) | 0.12 | | | | |
| 10 | Lens 5 | 1.3228(ASP) | 0.35 | Plastic | 1.650 | 21.4 | −1.76 |
| 11 | | 0.5481(ASP) | 0.50 | | | | |
| 12 | IR-filter | Plane | 0.21 | Glass | 1.517 | 64.2 | |
| 13 | | Plane | 0.65 | | | | |
| 14 | Image | Plane | | | | | |

TABLE 24

Aspheric Coefficients

| Surface # | 1 | 2 | 4 | 5 | 6 |
|---|---|---|---|---|---|
| k= | −4.5590E+01 | 1.0613E+01 | 2.0352E+01 | 6.5394E+00 | −3.9311E+01 |
| A4= | 1.9471E−01 | 3.5402E−01 | 1.5395E−01 | −5.0314E−02 | −3.0946E−01 |
| A6= | 3.0648E−02 | 4.1976E−01 | −6.0659E−03 | 9.4633E−03 | −2.3553E−01 |
| A8= | −6.2414E−02 | −1.9657E+00 | −1.0304E−01 | −5.2760E−01 | −3.8488E−01 |
| A10= | 5.3680E−02 | 5.5487E+00 | −1.3093E−02 | 7.5547E−01 | 4.1160E−01 |
| A12= | 4.1134E−02 | −4.6565E+00 | 4.0927E−02 | −5.3404E−01 | −1.4135E+00 |
| A14= | −1.1573E−01 | 3.7254E−06 | −1.8760E−01 | −2.3493E−02 | −7.5346E−03 |

| Surface # | 7 | 8 | 9 | 10 | 11 |
|---|---|---|---|---|---|
| k= | 3.4463E+01 | −1.0624E+01 | −3.0740E+00 | −7.3739E+00 | −3.5122E+00 |
| A4= | −1.4504E−01 | −8.0989E−03 | −2.2038E−01 | −1.0480E−01 | −1.0006E−01 |
| A6= | −7.0108E−02 | −5.1336E−02 | 1.1656E−01 | 1.0323E−02 | 3.5273E−02 |
| A8= | 8.5209E−03 | 1.0550E−01 | −6.2532E−02 | −1.0083E−03 | −1.0657E−02 |
| A10= | −1.9634E−02 | −8.2415E−02 | 1.2100E−02 | −1.0014E−03 | 1.9725E−03 |
| A12= | −1.3052E−03 | 2.8565E−02 | 1.0574E−03 | 3.0973E−04 | −1.8316E−04 |
| A14= | −2.8246E−03 | −3.1254E−03 | 1.8280E−03 | −4.8190E−09 | 5.7123E−06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| Embodiment 12 | | | |
|---|---|---|---|
| Fno | 2.4 | f2/f | 1.44 |
| FOV | 96.4 | R3/f | 3.52 |
| V1/V5 | 2.66 | CT4/CT5 | 2.80 |
| T12/CT1 | 1.41 | f5/f1 | 0.0035 |
| \|f/f3\|+\|f/f2\| | 0.98 | T12*10/f | 1.33 |
| CA11/CA52 | 0.39 | \|f/f3\| | 0.29 |
| (CT2+CT4)/(CT1+CT3) | 2.96 | | |

In the present wide-angle image taking lens system, the lens elements can be made of plastic or glass. If the lens elements are made of plastic, the cost will be effectively reduced. If the lens elements are made of glass, there is more freedom in distributing the refractive power of the wide-angle image taking lens system. Plastic lens elements can have aspheric surfaces, which allow more design parameter freedom (than spherical surfaces), so as to reduce the aberration and the number of the lens elements, as well as the total track length of the wide-angle image taking lens system.

In the present wide-angle image taking lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The wide-angle image taking lens system of the present invention can be used in focusing optical systems and can obtain better image quality. The wide-angle image taking lens system of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

While we have shown and described various embodiments in accordance with the present invention, it should be clear to those skilled in the art that further embodiments may be made without departing from the scope of the present invention.

What is claimed is:

1. A wide-angle image taking lens system comprising an aperture stop and an optical assembly, the optical assembly comprising: in order from an object side to an image side:

a first lens element with a negative refractive power having an aspheric object-side surface and an aspheric image-side surface;

a second lens element with a positive refractive power having an object-side surface being convex near an optical axis, the object-side and an image-side surfaces of the second lens element being aspheric, the second lens element being made of plastic material;

a third lens element with a refractive power having an aspheric object-side surface and an aspheric image-side surface, the third lens element being made of plastic material;

a fourth lens element with a positive refractive power having an image-side surface being convex near an optical axis, an object-side and the image-side surfaces of the fourth lens element being aspheric, the fourth lens element being made of plastic material;

a fifth lens element with a negative refractive power having an image-side surface being concave near an optical axis, an object-side and the image-side surfaces of the fifth lens element being aspheric, the fifth lens element being made of plastic material, more than one inflection point being formed on the image-side surface of the fifth lens element;

wherein an Abbe number of the first lens element is V1, an Abbe number of the fifth lens element is V5, a distance along the optical axis between the first lens element and the second lens element is T12, a central thickness of the first lens element is CT1, a focal length of the wide-angle image taking lens system is f, a focal length of the second lens element is f2, a focal length of the third lens element is f3, a maximum effective diameter of the object-side surface of the first lens element is CA11, a maximum effective diameter of the image-side surface of the fifth lens element is CA52, and the following conditions are satisfied:

$1.5 < V1/V5 < 3;$ $1.1 < T12/CT1 < 2.5;$ $0.2 < |f/f3| + |f/f2| < 1.5;$ $0.2 < CA11/CA52 < 0.5.$

2. The wide-angle image taking lens system as claimed in claim 1, wherein the central thickness of the first lens element is CT1, a central thickness of the second lens element is CT2, a central thickness of the third lens element is CT3, a central thickness of the fourth lens element is CT4, and the following condition is satisfied:

$2.7 < (CT2+CT4)/(CT1+CT3) < 4.5.$

3. The wide-angle image taking lens system as claimed in claim 2, wherein the focal length of the wide-angle image taking lens system is f, the focal length of the second lens element is f2, and the following condition is satisfied:

$0.9 < f2/f < 5.5.$

4. The wide-angle image taking lens system as claimed in claim 1, wherein the focal length of the wide-angle image taking lens system is f, a radius of curvature of the object-side surface of the second lens element is R3, and the following condition is satisfied:

$1.1 < R3/f < 4.$

5. The wide-angle image taking lens system as claimed in claim 1, wherein a central thickness of the fourth lens element is CT4, a central thickness of the fifth lens element is CT5, and the following condition is satisfied:

$1.85 < CT4/CT5 < 4.3.$

6. The wide-angle image taking lens system as claimed in claim 1, wherein a focal length of the first lens element is f1, a focal length of the fifth lens element is f5, and the following condition is satisfied:

$0 < f5/f1 < 0.5.$

7. The wide-angle image taking lens system as claimed in claim 6, wherein the focal length of the wide-angle image taking lens system is f, the distance along an optical axis between the first lens element and the second lens element is T12, and the following condition is satisfied:

$1.0 < T12*10/f < 3.0$.

8. The wide-angle image taking lens system as claimed in claim 1, wherein a maximal field of view of the wide-angle image taking lens system is FOV, and the following condition is satisfied:

$86 < FOV < 115$.

9. A wide-angle image taking lens system comprising an aperture stop and an optical assembly, the optical assembly comprising: in order from an object side to an image side:
a first lens element with a negative refractive power having an aspheric object-side surface and an aspheric image-side surface;
a second lens element with a positive refractive power having an object-side surface being convex near an optical axis, the object-side and an image-side surfaces of the second lens element being aspheric, the second lens element being made of plastic material;
a third lens element with a refractive power having an aspheric object-side surface and an aspheric image-side surface, the third lens element being made of plastic material;
a fourth lens element with a positive refractive power having an object-side surface being concave near an optical axis and an image-side surface being convex near an optical axis, the object-side and image-side surfaces of the fourth lens element being aspheric, the fourth lens element being made of plastic material;
a fifth lens element with a negative refractive power having an object-side surface being convex near an optical axis and an image-side surface being concave near an optical axis, the object-side and image-side surfaces of the fifth lens element being aspheric, the fifth lens element being made of plastic material, more than one inflection point being formed on the image-side surface of the fifth lens element;
the aperture stop being located between the image-side surface of the first lens element and the image-side surface of the second lens element;
wherein an Abbe number of the first lens element is V1, an Abbe number of the fifth lens element is V5, a distance along the optical axis between the first lens element and the second lens element is T12, a focal length of the wide-angle image taking lens system is f, and the following conditions are satisfied:

$1.5 < V1/V5 < 3$;

$0.8 < T12*10/f < 3.0$.

10. The wide-angle image taking lens system as claimed in claim 9, wherein the distance along an optical axis between the first lens element and the second lens element is T12, a central thickness of the first lens element is CT1, and the following condition is satisfied:

$1.1 < T12/CT1 < 2.5$.

11. The wide-angle image taking lens system as claimed in claim 9, wherein a focal length of the first lens element is f1, a focal length of the fifth lens element is f5, and the following condition is satisfied:

$0 < f5/f1 < 0.5$.

12. The wide-angle image taking lens system as claimed in claim 11, wherein a focal length of the second lens element is f2, a focal length of the third lens element is f3, and the following condition is satisfied:

$0.2 < |f/f3| + |f/f2| < 1.5$.

13. The wide-angle image taking lens system as claimed in claim 9, wherein the focal length of the wide-angle image taking lens system is f, a radius of curvature of the object-side surface of the second lens element is R3, and the following condition is satisfied:

$1.1 < R3/f < 4$.

14. The wide-angle image taking lens system as claimed in claim 13, wherein a central thickness of the first lens element is CT1, a central thickness of the second lens element is CT2, a central thickness of the third lens element is CT3, a central thickness of the fourth lens element is CT4, and the following condition is satisfied:

$2.7 < (CT2+CT4)/(CT1+CT3) < 4.5$.

15. The wide-angle image taking lens system as claimed in claim 9, wherein the focal length of the wide-angle image taking lens system is f, a focal length of the third lens element is f3, and the following condition is satisfied:

$0 < |f/f3| < 0.45$.

16. The wide-angle image taking lens system as claimed in claim 9, wherein the image-side surface of the second lens element is convex near an optical axis, and the object-side surface of the third lens element is convex near an optical axis.

17. The wide-angle image taking lens system as claimed in claim 16, wherein the focal length of the wide-angle image taking lens system is f, a focal length of the second lens element is f2, and the following condition is satisfied:

$0.9 < f2/f < 5.5$.

18. The wide-angle image taking lens system as claimed in claim 9, wherein a maximal field of view of the wide-angle image taking lens system is FOV, and the following condition is satisfied:

$86 < FOV < 115$.

* * * * *